United States Patent
Liu

(10) Patent No.: US 12,177,876 B2
(45) Date of Patent: Dec. 24, 2024

(54) WIRELESS COMMUNICATIONS SYSTEM, SCHEDULING METHOD, WIRELESS COMMUNICATIONS METHOD, AND APPARATUS

(71) Applicant: Huawei Technologies Co., Ltd., Shenzhen (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 17/541,664

(22) Filed: Dec. 3, 2021

(65) Prior Publication Data

US 2022/0095321 A1 Mar. 24, 2022

Related U.S. Application Data

(63) Continuation of application No. PCT/CN2020/094981, filed on Jun. 8, 2020.

(30) Foreign Application Priority Data

Jun. 6, 2019 (CN) .......................... 201910492934.4

(51) Int. Cl.
*H04W 74/08* (2024.01)
*H04L 5/00* (2006.01)
*H04W 72/542* (2023.01)

(52) U.S. Cl.
CPC ......... *H04W 72/542* (2023.01); *H04L 5/0023* (2013.01); *H04L 5/0032* (2013.01)

(58) Field of Classification Search
None
See application file for complete search history.

(56) References Cited

U.S. PATENT DOCUMENTS

2003/0198202 A1 10/2003 Busch
2016/0050684 A1* 2/2016 Ni .......................... H04W 72/12
370/329

(Continued)

FOREIGN PATENT DOCUMENTS

CN 1534915 A 10/2004
CN 1905730 A 1/2007

(Continued)

OTHER PUBLICATIONS

"Introduction of new V2X test case 6.5.1G.2 Frequency error for V2X Communication / Simultaneous E-UTRA V2X sidelink and E-UTRA uplink transmissions," 3GPP TSG RAN WG5 Meeting #79, R5-182908, Busan, South Korea, Total 4 pages, 3rd Generation Partnership Project, Valbonne, France (May 21-25, 2018).

(Continued)

*Primary Examiner* — Sithu Ko
(74) *Attorney, Agent, or Firm* — Leydig, Voit & Mayer, Ltd.

(57) ABSTRACT

A wireless communications system, a scheduling method, a wireless communications method, and an apparatus are provided. Frequencies of operating channels of a plurality of radio access nodes included in a first radio access cell in the wireless communications system are the same. A controller of the system may indicate one radio access node in the first radio access cell to serve as a transceiving access node in a first scheduling period, and indicate another radio access node to serve as an uplink access node. Because in the first scheduling period, the transceiving access node can perform uplink communication and downlink communication with a wireless terminal, and the uplink access node cannot send a radio signal, a problem of co-channel interference can be effectively solved.

18 Claims, 10 Drawing Sheets

(56) References Cited

U.S. PATENT DOCUMENTS

| | | | |
|---|---|---|---|
| 2016/0323853 A1 | 11/2016 | Kim et al. | |
| 2018/0041979 A1* | 2/2018 | Hampel | H04W 72/21 |
| 2019/0007253 A1* | 1/2019 | Cavalcanti | H04L 5/0041 |
| 2019/0335388 A1* | 10/2019 | Bulakci | H04W 24/02 |
| 2020/0145965 A1* | 5/2020 | Luo | H04B 7/15 |
| 2020/0260488 A1* | 8/2020 | Cherian | H04W 56/001 |
| 2020/0267636 A1* | 8/2020 | Cavalcanti | H04L 43/087 |

FOREIGN PATENT DOCUMENTS

| | | |
|---|---|---|
| CN | 101053276 A | 10/2007 |
| CN | 102204311 A | 9/2011 |
| CN | 102647722 A | 8/2012 |
| CN | 103796210 A | 5/2014 |
| CN | 103945492 A | 7/2014 |
| CN | 106162904 A | 11/2016 |
| CN | 106341821 A | 1/2017 |
| CN | 106877993 A | 6/2017 |
| CN | 107770867 A | 3/2018 |
| CN | 108123778 A | 6/2018 |
| EP | 2693657 A1 | 2/2014 |

OTHER PUBLICATIONS

Andjamba et al., "Interference Analysis of IEEE 802.11 Wireless Networks: A Case Study of Namibia University of Science and Technology," 2016 International Conference on ICT in Business Industry and Government (ICTBIG), Total 5 pages, Institute of Electrical and Electronics Engineers, New York, New York (Nov. 2016).

Wen Sanbao "Study of Dynamic Resource Allocation in High-Density Wireless Local Access Network," Xidian University, Total 71 pages (Feb. 2012). With an English Abstract.

\* cited by examiner

FIG. 5

WIRELESS COMMUNICATIONS SYSTEM, SCHEDULING METHOD, WIRELESS COMMUNICATIONS METHOD, AND APPARATUS

CROSS-REFERENCE TO RELATED APPLICATIONS

This application is a continuation of International Application No. PCT/CN2020/094981, filed on Jun. 8, 2020, which claims priority to Chinese Patent Application No. 201910492934.4, filed on Jun. 6, 2019. The disclosures of the aforementioned applications are hereby incorporated by reference in their entireties.

TECHNICAL FIELD

This application relates to the communications field, and in particular, to a wireless communications system, a scheduling method, a wireless communications method, and an apparatus.

BACKGROUND

A wireless local area network (WLAN) is a wireless communications network that is built according to the institute of electrical and electronics engineers (IEEE) 802.11 series standards. The WLAN includes an access point (AP) and a station (STA). The AP can provide a wireless access service for the STA.

Commonly used spectrums of the WLAN are a 2.4 gigahertz (GHz) unlicensed frequency band and a 5 GHz unlicensed frequency band. The 2.4 GHz frequency band may be divided into a plurality of channels with each having a bandwidth of 20 megahertz (MHz), and the plurality of channels may include 3 non-overlapping channels. The 5 GHz frequency band may include 24 non-overlapping channels with each having a bandwidth of 20 MHz, may include 5 non-overlapping channels with each having a bandwidth of 80 MHz, or may include 1 channel with a bandwidth of 160 MHz. Currently, neighboring APs in the WLAN need to use non-overlapping channels, to avoid co-channel interference.

However, because a quantity of non-overlapping channels on the 2.4 GHz frequency band is relatively small, and frequencies of neighboring channels are relatively close, a distance between APs cannot be excessively small (usually, the distance needs to reach 25 meters to 30meters), resulting in a relatively low system capacity of the WLAN. On the 5 GHz frequency band, there are only a few 80 MHz or 160 MHz channels. Therefore, when APs need to use relatively wide-bandwidth channels, a distance between the APs cannot be excessively small.

SUMMARY

This application provides a wireless communications system, a scheduling method, and a wireless communications method, and an apparatus, to resolve a problem that is of a relatively low system capacity and that is caused by a limited quantity of non-overlapping channels. Technical solutions are as follows.

According to one aspect, a wireless communications system is provided, including a controller and a first radio access cell. The first radio access cell includes a plurality of radio access nodes, and frequencies of operating channels of the plurality of radio access nodes are the same. The controller may be configured to indicate one radio access node in the first radio access cell to serve as a transceiving access node in the first radio access cell in a first scheduling period. The transceiving access node is a radio access node that can perform, in the first scheduling period, uplink communication and downlink communication with a wireless terminal within a coverage range of the first radio access cell. A radio access node that is other than the transceiving access node and that is in the first radio access cell is an uplink access node. The uplink access node is a radio access node that can receive a radio signal but cannot send a radio signal in the first scheduling period.

Because in the first scheduling period, only the transceiving access node in the first radio access cell can perform uplink communication and downlink communication with the wireless terminal, and the uplink access node cannot send the radio signal, but can receive the radio signal, not only a problem of co-channel interference can be effectively avoided, but also a probability that the radio signal sent by the wireless terminal is correctly received can be increased. Therefore, uplink receiving performance of the first radio access cell is improved. In addition, because the frequencies of the operating channels of the plurality of radio access nodes in the first radio access cell are the same, and the co-channel interference is avoided, a distance between neighboring radio access nodes can be relatively small, and each radio access node may use an operating channel with a relatively wide bandwidth. This effectively improves a system capacity and a data transmission rate.

Optionally, if the wireless communications system is a WLAN, basic service set identifiers (BSSID) of the plurality of radio access nodes in the first radio access cell are the same.

Alternatively, if the wireless communications system is a cellular mobile communications system, cellular identifiers of the plurality of radio access nodes in the first radio access cell are the same.

That the BSSIDs or cellular identifiers of the plurality of radio access nodes in the first radio access cell are the same can ensure that each radio access node in the first radio access cell can receive the radio signal sent by the wireless terminal within the coverage range of the first radio access cell. In this way, each wireless terminal can send a radio signal at relatively low transmit power, to reduce the co-channel interference during the uplink communication.

Optionally, the controller may be configured to indicate, based on a traffic volume or a to-be-sent traffic volume that is in a detection period and that is in a main lobe coverage area of an antenna beam of each radio access node in the first radio access cell, one radio access node with a maximum traffic volume in the first radio access cell to serve as the transceiving access node in the first radio access cell in the first scheduling period.

It can be ensured, by using the radio access node with the maximum traffic volume as the transceiving access node, that a propagation path loss between the determined transceiving access node and a wireless terminal with a relatively large traffic volume is relatively small, and both a signal-to-noise ratio (SNR) of a radio signal received by the transceiving access node and an SNR of a radio signal received by the wireless terminal are relatively high. This meets uplink and downlink communication requirements of the wireless terminal with the relatively large traffic volume.

Optionally, there are a plurality of wireless terminals within the coverage range of the first radio access cell, and the controller or the transceiving access node in the first radio access cell may be further configured to allocate time-frequency resources to the plurality of wireless terminals. A total resource volume of the time-frequency resource obtained by a wireless terminal that is in the plurality of wireless terminals and that is located inside a main lobe coverage area of an antenna beam of the transceiving access node in the first radio access cell is greater than a total resource volume obtained by a wireless terminal that is in the plurality of wireless terminals and is located outside the main lobe coverage area of the antenna beam of the transceiving access node in the first radio access cell.

Because a traffic volume of the main lobe coverage area of the antenna beam of the transceiving access node in the first radio access cell is usually relatively large, a time-frequency resource with a relatively large resource volume may be allocated to the wireless terminal in the area, to ensure a data transmission rate of the area. Because a traffic volume of another area is relatively small, only a time-frequency resource with a relatively small resource volume needs to be allocated, to ensure that a requirement on an SNR is effectively reduced based on that a data transmission rate requirement of the another area is met. Further, a requirement on transmit power of the transceiving access node can be reduced.

Optionally, the controller or the transceiving access node in the first radio access cell may be further configured to: indicate the wireless terminal located inside the main lobe coverage area of the antenna beam of the transceiving access node in the first radio access cell to use a first modulation and coding scheme (MCS), and indicate the wireless terminal located outside the main lobe coverage area of the antenna beam of the transceiving access node in the first radio access cell to use a second modulation and coding scheme. An order of the first modulation and coding scheme is greater than an order of the second modulation and coding scheme.

Because the traffic volume of the main lobe coverage area of the antenna beam of the transceiving access node is relatively large, the wireless terminal in the area may be indicated to use a relatively high-order MCS, to ensure the data transmission rate. Because a traffic volume of another area is relatively small, a wireless terminal in the another area may be indicated to use a relatively low-order MCS, to ensure that the requirement on the SNR is effectively reduced based on that the data transmission rate requirement is met.

Optionally, at least one radio access node in the first radio access cell may be further configured to: receive a radio signal sent by a target wireless terminal within the coverage range of the first radio access cell, and send uplink data correctly received from the radio signal to the controller. The controller may be further configured to send an indication to the transceiving access node in the first radio access cell based on the received uplink data, where the indication is used to indicate a receiving status of the radio signal sent by the target wireless terminal. The transceiving access node in the first radio access cell may be further configured to send an acknowledgment (ACK) signal to the target wireless terminal based on the indication.

The plurality of radio access nodes receive the radio signal. In this way, distributed uplink diversity receiving of the radio signal is implemented, and better uplink receiving performance can be obtained. In addition, this helps further reduce transmit power of the wireless terminal located outside the main lobe coverage area of the antenna beam of the transceiving access node. In this way, the co-channel interference during the uplink communication is effectively reduced.

Optionally, the system further includes a second radio access cell, and the second radio access cell includes a plurality of radio access nodes. Frequencies of operating channels of the plurality of radio access nodes in the second radio access cell are the same, and a channel of the second radio access cell and a channel of the first radio access cell overlap. For example, channels of two radio access cells may partially or completely overlap. The channel of the radio access cell is an operating channel of the radio access node in the radio access cell.

Because the two radio access cells may use channels whose frequencies overlap, a limitation on a quantity of non-overlapping channels in a 2.4 GHz frequency band and a 5 GHz frequency band may not be needed. In this way, each radio access cell can select a channel with a relatively wide bandwidth, and a data transmission rate of the wireless communications system is further improved.

Optionally, the controller may be further configured to indicate one radio access node in the second radio access cell to serve as a transceiving access node in the second radio access cell in a second scheduling period. The transceiving access node in the second radio access cell is a radio access node that can perform, in the second scheduling period, uplink communication and downlink communication with a wireless terminal within a coverage range of the second radio access cell. The second scheduling period and the first scheduling period overlap, and a distance between the transceiving access node in the first radio access cell and the transceiving access node in the second radio access cell is greater than a first threshold.

When selecting the transceiving access node, the controller enables a distance between transceiving access nodes of two neighboring radio access cells at a same time point to be greater than the first threshold. In other words, the transceiving access nodes are staggered as much as possible. In this way, co-channel interference between the two neighboring radio access cells during downlink communication can be effectively reduced.

Optionally, the controller may be further configured to: if detecting that a traffic volume that is in the detection period and that is of a target radio access cell in the first radio access cell and a traffic volume that is in the detection period and that is of a target radio access cell in the second radio access cell are beyond a traffic volume range, adjust, between a minimum adjustment range and a maximum adjustment range, a coverage range of the target radio access cell and a coverage range of a neighboring radio access cell of the target radio access cell, to enable a traffic volume that is in the detection period and that is of each radio access cell whose coverage range is adjusted to be within the traffic volume range.

The range of the radio access cell is adjusted based on the traffic volume. In this way, an area with a relatively large traffic volume can include a relatively large quantity of radio access cells, to meet a traffic volume requirement of the area. In addition, a quantity of transceiving access nodes in an area with a relatively small traffic volume may be reduced by reducing a quantity of radio access cells included in the area. In this way, co-channel interference between the radio access cells is reduced.

Optionally, the controller may be further configured to allocate different time-frequency resources to two wireless terminals located in different radio access cells, where a distance between the two terminals is less than a second threshold.

Optionally, the transceiving access node in the first radio access cell and the transceiving access node in the second radio access cell are further configured to cooperate with each other, to allocate a time-frequency resource to the wireless terminal within the coverage range of the radio access cell to which the transceiving access node belongs. Time-frequency resources obtained by two wireless terminals located in different radio access cells are different, where a distance between the two terminals is less than a second threshold.

The controller or the transceiving access node allocates different time-frequency resources to the two wireless terminals located in different radio access cells, where the distance between the two terminals is less than the second threshold. In this way, co-channel interference between the two neighboring radio access cells during uplink communication can be effectively reduced.

According to another aspect, a scheduling method is provided. The method may include: A controller indicates one of a plurality of radio access nodes in a first radio access cell to serve as a transceiving access node in a first scheduling period, and indicates a radio access node that is other than the transceiving access node in the first radio access cell and that is in the first radio access cell to serve as an uplink access node. The transceiving access node in the first radio access cell is a radio access node that can perform, in the first scheduling period, uplink communication and downlink communication with a wireless terminal within a coverage range of the first radio access cell. The uplink access node is a radio access node that can receive a radio signal but cannot send a radio signal in the first scheduling period. Frequencies of operating channels of the plurality of radio access nodes in the first radio access cell are the same.

Optionally, a process in which the controller indicates one of the plurality of radio access nodes in the first radio access cell to serve as the transceiving access node in the first scheduling period may include: The controller indicates, based on a traffic volume or a to-be-sent traffic volume that is in a detection period and that is in a main lobe coverage area of an antenna beam of each radio access node in the first radio access cell, one radio access node with a maximum traffic volume in the first radio access cell to serve as the transceiving access node in the first radio access cell in the first scheduling period.

Optionally, there are a plurality of wireless terminals within the coverage range of the first radio access cell, and the method may further include: The controller allocates time-frequency resources to the plurality of wireless terminals. A total resource volume of the time-frequency resource obtained by a wireless terminal that is in the plurality of wireless terminals and that is located inside a main lobe coverage area of an antenna beam of the transceiving access node in the first radio access cell is greater than a total resource volume obtained by a wireless terminal that is in the plurality of wireless terminals and is located outside the main lobe coverage area of the antenna beam of the transceiving access node in the first radio access cell.

Optionally, the method may further include: The controller indicates the wireless terminal located inside the main lobe coverage area of the antenna beam of the transceiving access node in the first radio access cell to use a first modulation and coding scheme; and the controller indicates the wireless terminal located outside the main lobe coverage area of the antenna beam of the transceiving access node in the first radio access cell to use a second modulation and coding scheme. An order of the first modulation and coding scheme is greater than an order of the second modulation and coding scheme.

Optionally, the method may further include: The controller receives uplink data sent by at least one radio access node in the first radio access cell, where the uplink data is data correctly received by the at least one radio access node from a radio signal sent by a target wireless terminal. The controller sends, based on the received uplink data, an indication to the transceiving access node in the first radio access cell, where the indication is used to indicate a receiving status of the radio signal sent by the target wireless terminal, and indicate the transceiving access node to send an acknowledgment signal to the target wireless terminal.

Optionally, the method may further include: The controller indicates one radio access node in a second radio access cell to serve as a transceiving access node in the second radio access cell in a second scheduling period. The transceiving access node in the second radio access cell is a radio access node that can perform, in the second scheduling period, uplink communication and downlink communication with a wireless terminal within a coverage range of the second radio access cell. The second scheduling period and the first scheduling period overlap, and a distance between the transceiving access node in the first radio access cell and the transceiving access node in the second radio access cell is greater than a first threshold.

Optionally, the method may further include: If detecting that a traffic volume that is in the detection period and that is of a target radio access cell in the first radio access cell and a traffic volume that is in the detection period and that is of a target radio access cell in the second radio access cell are beyond a traffic volume range, the controller adjusts, between a minimum adjustment range and a maximum adjustment range, a coverage range of the target radio access cell and a coverage range of a neighboring radio access cell of the target radio access cell, to enable a traffic volume that is in the detection period and that is of each radio access cell whose coverage range is adjusted to be within the traffic volume range.

Optionally, the method may further include: The controller allocates different time-frequency resources to two wireless terminals located in different radio access cells, where a distance between the two terminals is less than a second threshold.

According to still another aspect, a wireless communications method is provided. The method may include: A radio access node receives an indication sent by a controller, where the indication includes a status of a radio signal that is sent by a target wireless terminal and that is received by at least one of a plurality of radio access nodes in a radio access cell in which the radio access node is located, where frequencies of operating channels of the plurality of radio access nodes are the same, and the radio access node is one of the at least one radio access node or the radio access node is a radio access node other than the at least one radio access node. The radio access node sends an acknowledgment signal for the radio signal to the target wireless terminal based on the indication.

Optionally, the method may further include: The radio access node allocates time-frequency resources to a plurality of wireless terminals within a coverage range of the radio access cell. A total resource volume of a time-frequency resource obtained by a wireless terminal that is in the plurality of wireless terminals and that is located inside a main lobe coverage area of an antenna beam of the radio access node is greater than a total resource volume obtained by a wireless terminal that is in the plurality of wireless terminals and is located outside the main lobe coverage area of the antenna beam of the radio access node.

Optionally, the method may further include: The radio access node indicates the wireless terminal located inside the main lobe coverage area of the antenna beam of the radio access node to use a first modulation and coding scheme; and the radio access node indicates the wireless terminal located outside the main lobe coverage area of the antenna beam of the radio access node to use a second modulation and coding scheme. An order of the first modulation and coding scheme is greater than an order of the second modulation and coding scheme.

According to yet another aspect, a controller is provided. The controller has a function of implementing the scheduling method provided in the foregoing aspect. The controller includes at least one module, and the at least one module may be configured to implement the scheduling method provided in the foregoing aspect.

According to yet another aspect, a radio access node is provided. The radio access node has a function of implementing the wireless communications method provided in the foregoing aspect. The radio access node includes at least one module, and the at least one module may be configured to implement the wireless communications method provided in the foregoing aspect.

According to yet another aspect, a controller is provided. The controller includes a memory, a processor, and computer programs that are stored in the memory and that can be run on the processor. When executing the computer programs, the processor can implement the scheduling method provided in the foregoing aspect.

According to yet another aspect, a transceiving access node is provided. The transceiving access node includes a memory, a processor, and computer programs that are stored in the memory and that can be run on the processor. When executing the computer programs, the processor can implement the wireless communications method provided in the foregoing aspect.

According to yet another aspect, a computer-readable storage medium is provided. The computer-readable storage medium stores instructions. When the computer-readable storage medium is run on a computer, the computer is enabled to perform the scheduling method provided in the foregoing aspect or the wireless communications method provided in the foregoing aspect.

According to yet another aspect, a computer program product including instructions is provided. When the computer program product is run on a computer, the computer is enabled to perform the scheduling method provided in the foregoing aspect or the wireless communications method provided in the foregoing aspect.

Technical effects achieved by the scheduling method, the wireless communications method, the controller, the radio access node, the computer-readable storage medium, and the computer program product provided in the foregoing aspects are similar to technical effects achieved by corresponding technical means in the wireless communications system provided in the foregoing aspect. Details are not described herein again.

BRIEF DESCRIPTION OF DRAWINGS

FIG. 5 is a schematic diagram of division of time-frequency resources of a channel with a bandwidth of 80 MHz;

DESCRIPTION OF EMBODIMENTS

The following describes, with reference to the accompanying drawings, the solutions provided in embodiments of this application.

Figure 1:
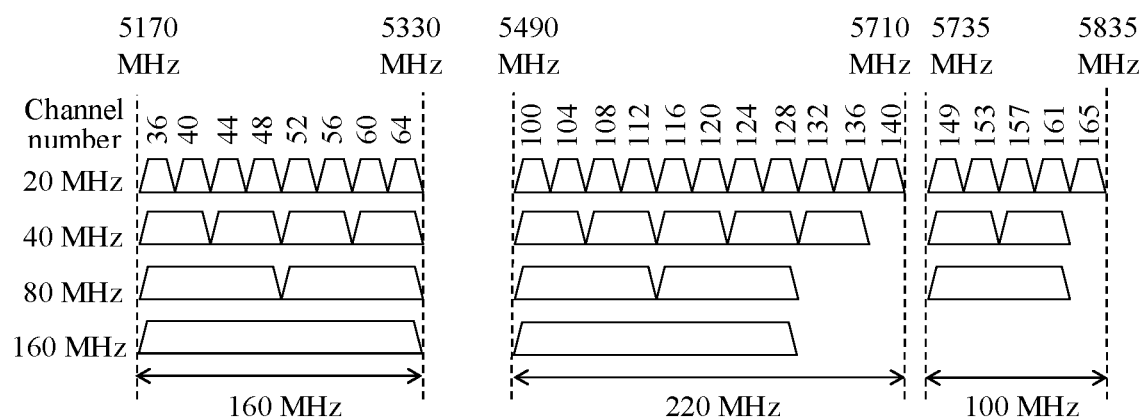
FIG. 1 is a schematic diagram of channel division in a 5 GHz frequency band.

FIG. 1 is a schematic diagram of channel division in a 5 GHz frequency band. As shown in FIG. 1, a frequency range of the 5 GHz frequency band is from 5170 megahertz (MHz) to 5835 MHz. The 5 GHz frequency band may include 24 channels that are with a bandwidth of 20 MHz and that do not overlap, may include 11 channels that are with a bandwidth of 40 MHz and that do not overlap, may include 5 channels that are with a bandwidth of 80 MHz and that do not overlap, or may include 1 channel with a bandwidth of 160 MHz. Currently, many APs and STAs support channels with bandwidths of 80 MHz and 160 MHz.

In different jurisdictions, a case in which a channel in the 5 GHz frequency band is allowed to be used is different. For example, on the 24 channels that are with a bandwidth of 20 MHz and that are included in the 5 GHz frequency band, open channels in China only include channels whose channel numbers are 36, 40, 44, 48, 52, 56, 60, and 64 in a low frequency band, and channels whose channel numbers are 149, 153, 157, 161, and 165 in a high frequency band.

Figure 2:
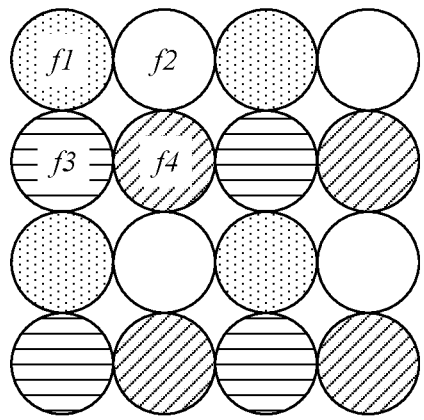
FIG. 2 is a schematic diagram of an architecture of a WLAN.

To cover a relatively large area, a WLAN needs a plurality of APs to form a radio access network (namely, networking). To avoid co-channel interference, neighboring APs in each radio access network need to use non-overlapping channels. A quantity of non-overlapping channels used by each AP in each radio access network is a frequency reuse factor N of the radio access network. For example, FIG. 2 is a schematic architectural diagram of a WLAN. As shown in FIG. 2, each radio access network includes 4 APs, and center frequencies of channels used by the 4 APs are respectively f1 to f4. In other words, the frequency reuse factor N of the radio access network is equal to 4.

The 2.4 GHz frequency band has only 3 channels whose frequencies are different and that are with a bandwidth of 20 MHz. Therefore, networking can only be performed when the frequency reuse factor N is equal to 3. Because the quantity of channels whose frequencies are different is small, and frequencies of neighboring channels are close, co-channel interference is relatively severe. Therefore, a distance between APs needs to be set to a relatively large value, and a system capacity is relatively low.

Currently, APs that are of WLANs and that are deployed in scenarios such as enterprise offices, primary and secondary schools, and university campuses require relatively high density. Therefore, the 5 GHz frequency band is usually used, and a channel with a bandwidth of 20 MHz is used, to ensure that a relatively large frequency reuse factor can be used. However, in the 5 GHz frequency band, there are a relatively small quantity of channels with a bandwidth of 80 MHz. Therefore, a WLAN with high-density APs cannot use a wide-bandwidth channel with a bandwidth of 80 MHz or higher.

In addition, in the WLAN with high-density APs, a distance between the APs is usually from 5 meters to 10 meters. Density of the APs is relatively high, and a quantity of the APs is relatively large. Because a traffic volume of a STA constantly changes, traffic volumes in areas in the radio access network may be unevenly distributed. For example, in a given period, it is possible that traffic volumes in main lobe coverage areas of antenna beams of some APs are relatively large, but traffic volumes in main lobe coverage areas of antenna beams of some other APs are very small. Therefore, this may cause waste of spectrum resources, and limits improvement of the system capacity.

It should be noted that, in this embodiment of this application, the non-overlapping channels may be channels whose frequency ranges do not overlap, and channels with a same frequency may be channels whose frequency ranges are the same.

This application provides a wireless communications system. The system can resolve a problem of a relatively low system capacity caused by a limited quantity of non-overlapping channels.

Figure 3:
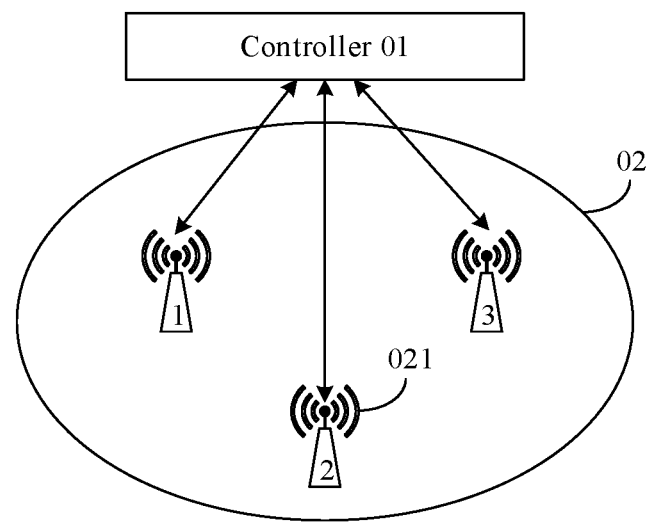
FIG. 3 is an architectural diagram of a wireless communications system according to an embodiment of this application.

FIG. 3 is an architectural diagram of a wireless communications system according to an embodiment of this application. As shown in FIG. 3, the system may include a controller 01 and a first radio access cell 02. The first radio access cell 02 includes a plurality of radio access nodes 021 (In FIG. 3, only three radio access nodes 021 are used as an example for schematic description). Frequencies of operating channels (operating channel) of the plurality of radio access nodes 021 in the first radio access cell 02 are the same. The controller 01 may establish a communication connection to each radio access node 021, for example, may establish the communication connection in a wired manner. The operating channel of the radio access node may also be referred to as a channel. This is not limited in this embodiment of this application.

The controller 01 may be configured to indicate one radio access node 021 in the first radio access cell 02 to serve as a transceiving access node in the first radio access cell 02 in a first scheduling period. The transceiving access node in the first radio access cell 02 is a radio access node that can perform, in the first scheduling period, uplink communication and downlink communication with a wireless terminal within a coverage range of the first radio access cell 02.

Another radio access node 021 that is other than the transceiving access node and that is in the first radio access cell 02 is an uplink access node. The uplink access node is a radio access node that can receive a radio signal but cannot send a radio signal in the first scheduling period.

In this embodiment of this application, in an optional implementation, the controller 01 may send a scheduling indication of the first scheduling period to each radio access node 021 in the first radio access cell 02 before the first scheduling period starts. For example, the scheduling indication may be sent in a broadcast, multicast, or unicast manner. The scheduling indication may include an identifier of the transceiving access node in the first scheduling period. After receiving the scheduling indication, each radio access node 021 in the first radio access cell 02 may determine, based on the scheduling indication, that an identity of the radio access node 021 is the transceiving access node or the uplink access node, and then may execute a corresponding scheduling task in the first scheduling period based on the determined identity.

In this implementation, duration of the first scheduling period may be fixed duration, for example, may be 5 milliseconds (ms), 10 ms, or the like. Alternatively, duration of the first scheduling period may be dynamically determined by the controller 01 based on a change status of a traffic volume of a main lobe coverage area of an antenna beam of each access node 021 in the first radio access cell 02. For example, when the traffic volume of the main lobe coverage area of the antenna beam of each access node 021 fluctuates relatively greatly, the duration of the first scheduling period may be relatively short. When the traffic volume of the main lobe coverage area of the antenna beam of each access node 021 fluctuates relatively slightly, the duration of the first scheduling period may be relatively long.

In another optional implementation, after completing deployment of the first radio access cell 02, the controller 01 may directly send a scheduling list to each radio access node 021 in the first radio access cell 02, for example, may send the scheduling list in the broadcast, multicast, or unicast manner. The scheduling list may include identifiers of transceiving access nodes of the first radio access cell 02 in a plurality of pre-divided different scheduling periods, and the plurality of scheduling periods include the first scheduling period. After receiving the scheduling list, each radio access node 021 in the first radio access cell 02 may successively serve as the transceiving access node in the first radio access cell 02 in different scheduling periods based on an indication of the scheduling list. In this implementation, the duration of the first scheduling period may be fixed duration, for example, may be 5 milliseconds (ms), 10 ms, or the like.

In this embodiment of this application, on one hand, the wireless communications system may be a WLAN. In the WLAN, the radio access node 021 may be referred to as an AP, and the wireless terminal may be referred to as a STA. The AP may be a network device such as a router or a switch that supports the WLAN, and the STA may be a terminal device such as a mobile phone or a computer that supports the WLAN.

For example, it is assumed that in the system shown in FIG. 3, the controller 01 indicates an AP numbered 1 to be the transceiving access node in the first scheduling period. Therefore, in the first scheduling period, the AP numbered 1 may perform uplink communication and downlink communication with a STA within a coverage range of the first radio access cell 02. APs numbered 2 and 3 are used as uplink access nodes, can only receive a radio signal sent by the STA within the coverage range of the first radio access cell 02, and cannot send a radio signal to the STA.

On the other hand, the wireless communications system may be a cellular mobile communications system such as a long term evolution (LTE) system or a 5th generation (5G) mobile communications network, for example, may be an LTE or 5G small cell network. In the cellular mobile communications system, based on a mobile communications technology used in the cellular mobile communications system, the radio access node 021 may be referred to as a base station, a NodeB (NB), an evolved NodeB (eNB), or the like. The wireless terminal may be referred to as user equipment (UE). The UE may be a terminal device such as a mobile phone.

In conclusion, the embodiment of this application provides the wireless communications system, and the frequencies of the operating channels of the plurality of radio access nodes in the first radio access cell are the same. In the first scheduling period, in the first radio access cell, only the transceiving access node can perform uplink communication and downlink communication with the wireless terminal, and another uplink access node cannot send a radio signal. Therefore, co-channel interference during the downlink communication can be effectively reduced. In addition, each radio access node in the first radio access cell can receive the radio signal. Therefore, a probability that the radio signal sent by the wireless terminal is correctly received can be increased, and uplink receiving performance of the first radio access cell can be improved. In addition, the wireless terminal within the coverage range of the first radio access cell may send, at relatively low transmit power, the radio signal to a radio access node that is relatively close to the wireless terminal. Therefore, co-channel interference during the uplink communication can be effectively reduced.

In addition, the frequencies of the operating channels of the plurality of radio access nodes in the first radio access cell are the same, and the co-channel interference is relatively small. Therefore, the radio access node in the first radio access cell may use an operating channel with a relatively wide bandwidth, for example, may use an operating channel with a bandwidth of 80 MHz or 160 MHz. In this way, a data transmission rate of the first radio access cell is effectively improved. In addition, because a problem of the co-channel interference is overcome, a distance between neighboring radio access nodes in the first radio access cell may be relatively small. In other words, density of the radio access nodes deployed in the first radio access cell may be relatively high. Therefore, the system capacity of the wireless communications system can be effectively improved.

Optionally, in this embodiment of this application, if the wireless communications system is the WLAN, BSSIDs of the plurality of radio access nodes 021 in the first radio access cell 02 are the same. The BSSID may be used to uniquely identify one BSS, and each BSS may include the plurality of radio access nodes 021 and one or more STAs associated with the plurality of radio access nodes 021.

Because the BSSIDs of the plurality of radio access nodes 021 in the first radio access cell 02 are the same, a STA located within the coverage range of the first radio access cell 02 can be associated with each radio access node 021 in the first radio access cell 02, so that each radio access node 021 can receive a radio signal sent by the STA located within the coverage range of the first radio access cell 02. In this way, it is ensured that the STA can send the radio signal at relatively low transmit power, to reduce the co-channel interference during the uplink communication.

Alternatively, if the wireless communications system is the cellular mobile communications system, cellular identifiers of the plurality of radio access nodes 021 in the first radio access cell 02 are the same. In this way, each radio access node 021 in the first radio access cell 02 can receive a radio signal sent by UE within the coverage range of the first radio access cell 02. It is ensured that the UE can send the radio signal at relatively low transmit power, to reduce the co-channel interference during the uplink communication.

Optionally, the controller 01 may be configured to indicate, based on a traffic volume or a to-be-sent traffic volume that is in a detection period and that is in a main lobe coverage area of an antenna beam of each radio access node 021 in the first radio access cell 02, one radio access node 021 with a maximum traffic volume in the first radio access cell 02 to serve as the transceiving access node in the first radio access cell 02 in the first scheduling period.

Duration of the detection period may be equal to or unequal to the duration of the first scheduling period. For example, the detection period may be one scheduling period before the first scheduling period, or the detection period may include several scheduling periods before the first scheduling period.

In this embodiment of this application, the controller 01 may determine, based on uplink data sent by each radio access node 021 in the first radio access cell 02 in the detection period, the traffic volume that is in the detection period and that is in the main lobe coverage area of the antenna beam of each radio access node 021. Alternatively, the controller may determine, based on cached uplink data sent by each radio access node 021, the to-be-sent traffic volume of the main lobe coverage area of the antenna beam of each radio access node 021.

It can be ensured, by using the radio access node 021 with the maximum traffic volume as the transceiving access node, that a propagation path loss between the determined transceiving access node and a wireless terminal with a relatively large traffic volume is relatively small, and both an SNR received by the transceiving access node and an SNR a radio signal received by the wireless terminal are relatively high. This meets uplink and downlink communication requirements of the wireless terminal with the relatively large traffic volume.

Figure 4:
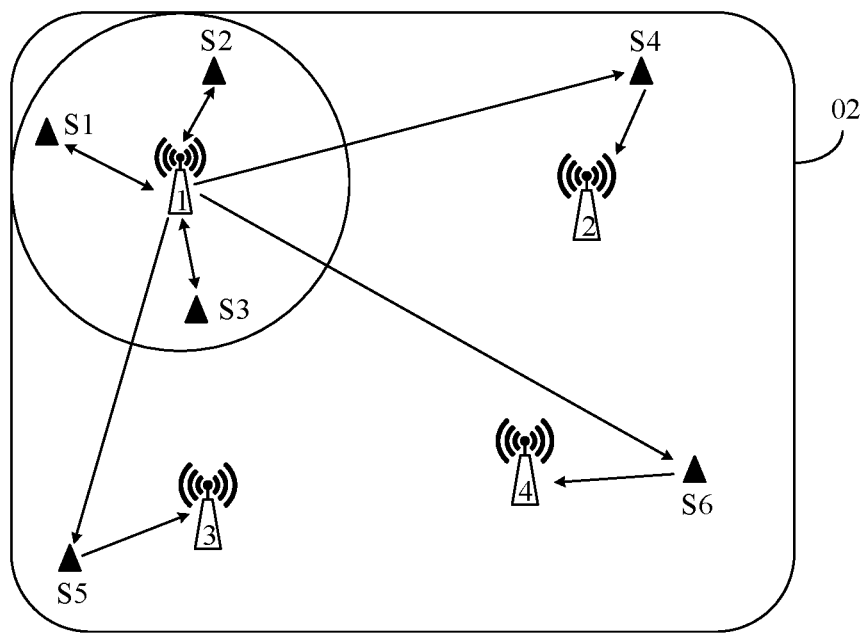
FIG. 4 is an architectural diagram of another wireless communications system according to an embodiment of this application.

FIG. 4 is an architectural diagram of another wireless communications system according to an embodiment of this application. A WLAN is used as an example. As shown in FIG. 4, it is assumed that the first radio access cell 02 includes 4 APs numbered 1 to 4, and the controller 01 detects that a traffic volume that is in a previous scheduling period (that is, the previous scheduling period is the detection period) and that is in a main lobe coverage area of an antenna beam of the AP numbered 1 is the largest. In this case, the controller 01 may indicate the AP numbered 1 to serve as the transceiving access node in the first radio access cell 02 in the first scheduling period, and indicate the APs numbered 2 to 4 to serve as uplink access nodes of the first radio access cell 02 in the first scheduling period.

Optionally, there are a plurality of wireless terminals within the coverage range of the first radio access cell 02, and the controller 01 or the transceiving access node in the first radio access cell 02 may be further configured to allocate time-frequency resources to the plurality of wireless terminals.

A total resource volume of the time-frequency resource obtained by a wireless terminal that is in the plurality of wireless terminals and that is located inside a main lobe coverage area of an antenna beam of the transceiving access node in the first radio access cell 02 is greater than a total resource volume obtained by a wireless terminal that is in the plurality of wireless terminals and is located outside the main lobe coverage area of the antenna beam of the transceiving access node in the first radio access cell 02.

It can be learned from the foregoing analysis that a traffic volume of the main lobe coverage area of the antenna beam of the transceiving access node in the first radio access cell 02 is usually relatively large. Therefore, a time-frequency resource with a relatively large resource volume may be allocated to the wireless terminal in the area, to ensure a data transmission rate of the area. Because a traffic volume of another area is relatively small, only a time-frequency resource with a relatively small resource volume needs to be allocated, to ensure that a requirement on an SNR is effectively reduced based on that a data transmission rate requirement of the another area is met. Further, a requirement on transmit power of the transceiving access node can be reduced.

In addition, the transceiving access node is determined based on a size of the traffic volume, and a time-frequency resource with a relatively large resource volume is allocated to the wireless terminal located inside the main lobe coverage area of the antenna beam of the transceiving access node. This can avoid waste of spectrum resources caused by uneven traffic volume distribution in each area of the first radio access cell, and effectively improve spectrum resource utilization.

In this embodiment of this application, the controller 01 or the transceiving access node may determine, based on signal strength that is of a radio signal sent by each of the plurality of wireless terminals and that is detected by the transceiving access node, whether each wireless terminal is located inside the main lobe coverage area of the antenna beam of the transceiving access node. For example, a wireless terminal whose signal strength is greater than a strength threshold may be determined as the wireless terminal located inside the main lobe coverage area of the antenna beam of the transceiving access node. For example, the controller 01 or the transceiving access node may determine, based on a received signal strength indicator (received signal strength indicator, RSSI), signal strength of the radio signal sent by each wireless terminal.

Optionally, in addition to the signal strength, the controller 01 or the transceiving access node may further determine, in a manner, for example, a manner in which a round-trip time (round trip time, RTT)-based positioning algorithm is used, whether each wireless terminal is located inside the main lobe coverage area of the antenna beam of the transceiving access node. A method for determining a location of the wireless terminal is not limited in this embodiment of this application.

It should be noted that, if the wireless communications system is the WLAN, the time-frequency resource may be a resource unit (resource unit, RU), and the resource volume of the time-frequency resource may be a bandwidth of the RU. Therefore, for the WLAN, the controller 01 or the transceiving access node in the first radio access cell 02 may allocate an RU with a relatively wide bandwidth to a STA located inside the main lobe coverage area of the antenna beam of the transceiving access node, and allocate an RU with a relatively narrow bandwidth to a STA located outside the main lobe coverage area of the antenna beam of the transceiving access node.

Figure 5:
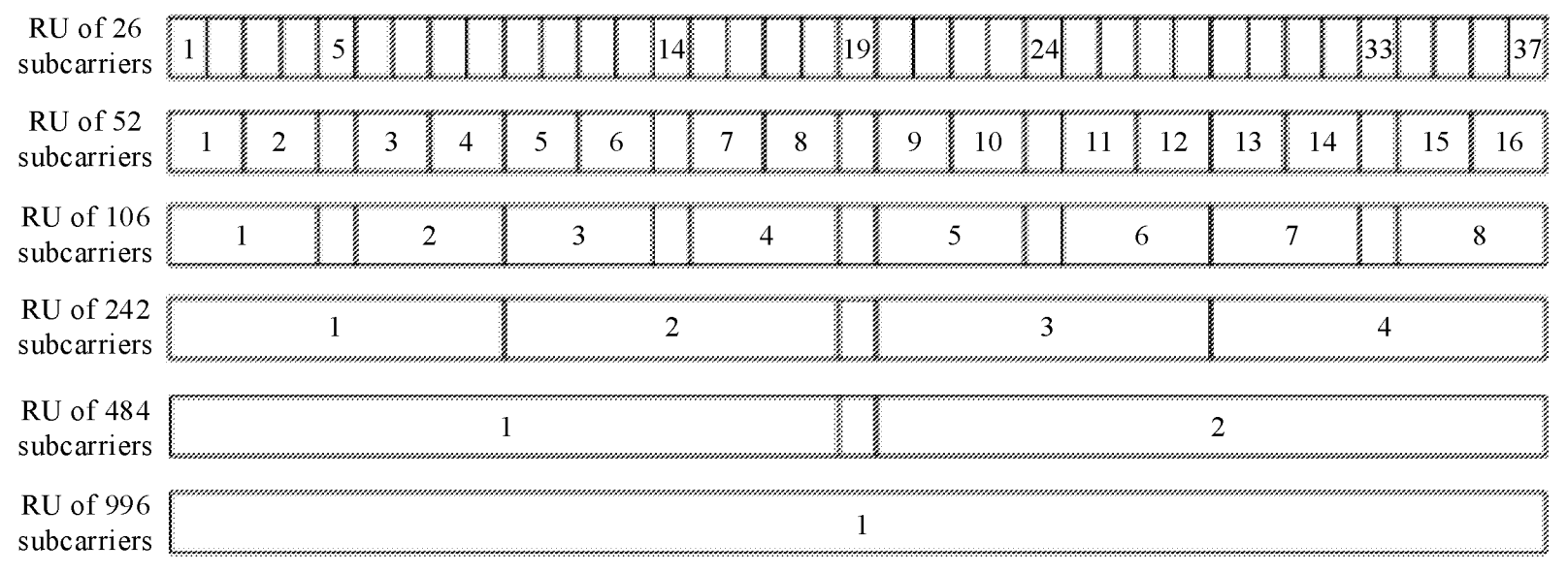

In the IEEE802.11ax draft protocol, resources of an entire channel are divided into a plurality of orthogonal RUs, and a bandwidth of the RU varies with a division manner. In other words, the bandwidth of the RU is not a fixed value. FIG. 5 is a schematic diagram of division of RUs of a channel with a bandwidth of 80 MHz. It can be learned from FIG. 5 that each RU may include 26 subcarriers, and a bandwidth is about 2 MHz. Alternatively, each RU may further include a quantity of subcarriers such as 52, 106, 242, 484, or 996, and bandwidths of the subcarriers are about 4 MHz, 8 MHz, 19 MHz, 38 MHz, and 78 MHz respectively. In addition, when a bandwidth of an RU is fixed, a wider bandwidth of a channel indicates a larger quantity of RUs that can be obtained through division in the channel. For example, quantities of RUs of 26, 52, 106, 242, 484, and 996 subcarriers on the channel with the bandwidth of 80 MHz are 37, 16, 8, 4, and 1 respectively, and quantities of RUs of 26, 52, 106, 242, 484, and 996 subcarriers on a channel with a bandwidth of 160 MHz are 74, 32, 16, 8, 4, and 2 respectively.

In the wireless communications system provided in this embodiment of this application, frequencies of operating channels of a plurality of radio access nodes in a first radio access cell are the same. Therefore, each radio access node may use an operating channel with a relatively wide bandwidth, for example, may use an operating channel with a bandwidth of 80 MHz or 160 MHz to provide a wireless access service for a STA. Correspondingly, in an operating channel of a transceiving access node, sufficient RUs (for example, the RUs of the 242, 484, and 996 subcarriers) with a relatively wide bandwidth may be obtained through division, and are allocated to a STA inside a main lobe coverage area of an antenna beam of the transceiving access node; and RUs (for example, the RUs of the 26 and 56 subcarriers) with a relatively narrow bandwidth may be obtained through division, and are allocated to a STA outside the main lobe coverage area of the antenna beam of the transceiving access node.

For example, referring to FIG. 4, it is assumed that an operating channel of each AP in the first radio access cell 02 is the channel with the bandwidth of 80 MHz. The transceiving access node in the first scheduling period is the AP numbered 1, and the APs numbered 2, 3, and 4 are all uplink access nodes. In addition, STAs numbered S1, S2, and S3 are located inside a main lobe coverage area of an antenna beam of the AP numbered 1, and STAs numbered S4 to S6 are all located outside the main lobe coverage area of the antenna beam of the AP numbered 1.

With reference to the schematic diagram of the division of the RUs shown in FIG. 5, the controller 01 may allocate, to the STA numbered S1, an RU that is of the 484 subcarriers and that is numbered 2, allocate, to the STA numbered S2, an RU that is of the 242 subcarriers and that is numbered 2, and allocate, to the STA numbered S3, an RU that is of the 106 subcarriers and that is numbered 2. In addition, the controller 01 may allocate, to the STA numbered S4, an RU that is of the 26 subcarriers and that is numbered 1, allocate, to the STA numbered S5, an RU that is of the 26 subcarriers and that is numbered 5, and allocate, to the STA numbered S6, an RU that is of the 26 subcarriers and that is numbered 19. A total bandwidth of the RU allocated by the controller 01 to the STA located outside the main lobe coverage area of the antenna beam of the AP numbered 1 is about 6 MHz, and a total bandwidth of the RU allocated by the controller 01 to the STA located inside the main lobe coverage area of the antenna beam of the AP numbered 1 is about 65 MHz. A traffic volume of the main lobe coverage area of the antenna beam of the AP numbered 1 is relatively large, and the total bandwidth of the RU allocated to the STA located inside the area is also relatively large. Therefore, a data transmission rate of the area can be effectively improved, and spectrum resource utilization is improved.

If the wireless communications system is a cellular system, the time-frequency resource may be a time-frequency resource element (resource element, RE) or a resource block (resource block, RB). The resource volume of the time-frequency resource may be at least one of a bandwidth occupied by an RB allocated to the wireless terminal and a quantity of orthogonal frequency division multiplexing (OFDM) symbols. A bandwidth occupied by each RB and the quantity of OFDM symbols are fixed. Therefore, a quantity of RBs can also be used to measure the resource volume.

For example, a total quantity of RBs allocated by the controller 01 to UE located inside the main lobe coverage area of the transceiving access node may be greater than a total quantity of RBs allocated to UE located outside the main lobe coverage area of the transceiving access node.

Optionally, the controller 01 or the transceiving access node in the first radio access cell 02 may be further configured to: indicate the wireless terminal located inside the main lobe coverage area of the antenna beam of the transceiving access node in the first radio access cell 02 to use a first MCS, and indicate the wireless terminal located outside the main lobe coverage area of the antenna beam of the transceiving access node to use a second MCS. An order of the first MCS is greater than an order of the second MCS.

Because the traffic volume of the main lobe coverage area of the antenna beam of the transceiving access node is relatively large, the wireless terminal in the area may be indicated to use a relatively high-order MCS, to ensure the data transmission rate. Because a traffic volume of another area is relatively small, a wireless terminal in the another area may be indicated to use a relatively low-order MCS, to ensure that the requirement on a signal-to-noise ratio is effectively reduced based on that the data transmission rate requirement is met.

It should be noted that in this embodiment of this application, the foregoing time-frequency resource allocation solution and the MCS indication solution may be combined, and may be applicable to an uplink direction and a downlink direction.

For example, in the WLAN, before performing uplink communication or downlink communication with a STA within the coverage range of the first radio access cell 02, the transceiving access node in the first radio access cell 02 may send a scheduling frame to the STA. The scheduling frame may indicate an RU allocated to the STA that receives the scheduling frame and an MCS that needs to be used. Optionally, the scheduling frame may be a trigger frame defined in the IEEE802.11ax protocol draft.

In the cellular mobile communications system, the controller 01 or the transceiving access node of the first radio access cell 02 may send scheduling control information to the UE within the coverage range of the first radio access cell 02 through a dedicated control channel (DCCH) or a common control channel (CCCH), to indicate an RB allocated to the UE and an MCS that needs to be used.

In the downlink direction, for the main lobe coverage area of the antenna beam of the transceiving access node, because an instantaneous traffic volume is relatively large, the controller or the transceiving access node may allocate a time-frequency resource with a relatively large resource volume (for example, an RU with a relatively wide bandwidth) to the wireless terminal located in the area, and indicate the wireless terminal to use a relatively high-order MCS, to provide a relatively high downlink data transmission rate for the wireless terminal in the area. A relatively high SNR is required when the time-frequency resource with the relatively large resource volume and the relatively high-order MCS are used to perform downlink communication. Because the wireless terminal located in the area is relatively close to the transceiving access node, and is located inside the main lobe coverage area of the antenna beam of the transceiving access node, a propagation path loss is relatively small, and the transceiving access node can better meet a requirement on the SNR without relatively high transmit power.

For another area that is other than the main lobe coverage area of the antenna beam of the transceiving access node, because an instantaneous traffic volume is relatively small, a time-frequency resource with a relatively small resource volume (for example, an RU with a relatively narrow bandwidth) is allocated to a wireless terminal located in the another area, and the wireless terminal is indicated to use a relatively low-order MCS, to meet a downlink communication requirement of the another area. The wireless terminal located in the another area is relatively far away from the transceiving access node, and is located outside the main lobe coverage area of the antenna beam of the transceiving access node. A propagation path loss is relatively large. However, because the wireless terminal located in the another area uses the time-frequency resource with the relatively small resource volume and the relatively low-order MCS, an SNR required for performing downlink communication is also relatively low. Therefore, the transceiving access node can meet a downlink communication requirement of the wireless terminal in the another area without providing relatively high transmit power. Therefore, co-channel interference during the downlink communication can be effectively reduced.

Similarly, in the uplink direction, for the main lobe coverage area of the antenna beam of the transceiving access node, because an instantaneous traffic volume is relatively large, a time-frequency resource with a relatively large resource volume may be allocated to the wireless terminal located in the area, and the wireless terminal is indicated to use a relatively high-order MCS, to provide a relatively high uplink data transmission rate for the wireless terminal in the area. Because the wireless terminal located in the area is relatively close to the transceiving access node, and is located inside the main lobe coverage area of the antenna beam of the transceiving access node, a requirement on the SNR can be better met.

For another area that is other than the main lobe coverage area of the antenna beam of the transceiving access node, because an instantaneous traffic volume is relatively small, a time-frequency resource with a relatively small resource volume is allocated to a wireless terminal located in the another area, and the wireless terminal is indicated to use a relatively low-order MCS to meet an uplink communication requirement. In addition, because all radio access nodes of the first radio access cell can receive a radio signal, a radio signal sent by the wireless terminal located in the another area may be received by the radio access node that is relatively close to the wireless terminal, and the propagation path loss is relatively small. In addition, an SNR required for performing uplink communication by using the time-frequency resource with the relatively small resource volume and the relatively low-order MCS is also relatively low. Therefore, the wireless terminal located in the another area needs only relatively low transmit power to meet the uplink communication requirement of the wireless terminal. Therefore, co-channel interference during the uplink communication can be effectively reduced.

For example, FIG. 4 is used as an example. It is assumed that in the first scheduling period, the transceiving access node in the first radio access cell 02 is the AP numbered 1, the STAs numbered S1, S2, and S3 are located inside the main lobe coverage area of the antenna beam of the AP numbered 1, and the STAs numbered S4 to S6 are all located outside the main lobe coverage area of the antenna beam of the AP numbered 1. In this case, the controller 01 may allocate RUs with a relatively wide bandwidth to the STAs numbered S1, S2, and S3, and indicate the STAs to use a relatively high-order MCS. The controller 01 may allocate RUs with a relatively narrow bandwidth to the STAs numbered S4 to S6, and indicate the STAs to use a lower-order MCS.

In the downlink direction, provided that an SNR requirement required for downlink data transmission of the STAs numbered S1, S2, and S3 is met, the AP numbered 1 may maintain relatively low transmit power. Therefore, interference to another neighboring radio access cell is relatively small. The STAs numbered S4 to S6 are far away from the AP numbered 1, and are located outside the main lobe coverage area of the antenna beam of the AP numbered 1. Because the RU with the relatively narrow bandwidth and the relatively low-order MCS are used, the SNR required for the downlink data transmission is relatively low. Therefore, even if the transmit power of the AP numbered 1 is relatively low, downlink data transmission requirements of the STAs numbered S4 to S6 can be met.

In the uplink direction, the STAs numbered S4 to S6 are far away from the AP numbered 1, but radio signals sent by the STAs may be received by the APs numbered 2 to 4. In addition, because the STAs numbered S4 to S6 use the RU with the relatively narrow bandwidth and the relatively low-order MCS, the STAs numbered S4 to S6 may use relatively low transmit power. In this way, co-channel interference to another neighboring radio access cell is reduced.

Optionally, in this embodiment of this application, at least one radio access node 021 in the first radio access cell 02 may be further configured to: receive a radio signal sent by a target wireless terminal within the coverage range of the first radio access cell 02, and send uplink data correctly received from the radio signal to the controller 01.

The controller 01 may be further configured to send an indication to the transceiving access node in the first radio access cell 02 based on the received uplink data. The indication is used to indicate a receiving status of the radio signal sent by the target wireless terminal.

The transceiving access node in the first radio access cell 02 may be further configured to send an ACK signal to the target wireless terminal based on the indication.

Each radio access node in the first radio access cell 02 can receive the radio signal sent by the wireless terminal, but only the transceiving access node can perform downlink communication with the wireless terminal. Therefore, after receiving the radio signal sent by the target wireless terminal, any radio access node may send the uplink data correctly received from the radio signal to the controller 01. Then, the controller 01 may perform selective diversity receiving processing on the uplink data sent by the at least one radio access node, to determine the receiving status of the radio signal sent by the target wireless terminal. In addition, the controller 01 may send, to the transceiving access node in the first radio access cell 02, an indication used to indicate the receiving status, so that the transceiving access node sends the ACK signal to the target wireless terminal. The target wireless terminal may determine, based on the ACK signal, whether the radio signal is correctly received. If the radio signal is not correctly received, the target wireless terminal may resend the radio signal. The selective diversity receiving processing may include combined processing, deduplication processing (namely, deletion of duplicate data), and the like. The receiving status of the radio signal may be used to reflect whether the uplink data included in the radio signal is correctly received by the radio access node.

In a WLAN technology, to improve data transmission efficiency, the STA may aggregate a plurality of MAC protocol data units (MAC protocol data unit, MPDU) into one aggregate MPDU (A-MPDU) at a medium access control (medium access control, MAC) layer by using a frame aggregation technology. In other words, the radio signal sent by the STA may include the A-MPDU obtained by aggregating the plurality of MPDUs. Therefore, after receiving the radio signal, each radio access node in the first radio access cell may send, to the controller 01, a correctly received MPDU in the plurality of MPDUs included in the A-MPDU in the radio signal. The controller 01 may perform selective diversity receiving processing on an MPDU sent by each radio access node, and send, to the transceiving access node, an indication used to indicate receiving statuses of the plurality of MPDUs in the A-MPDU. The transceiving access node sends a block acknowledgment (block ACK, BA) signal to a target STA. The indication of the receiving status may indicate which MPDU in the A-MPDU sent by the target STA has been correctly received, and which MPDU has not been correctly received. A target mobile terminal may resend, based on the BA signal sent by the transceiving access node based on the indication, the MPDU that is not correctly received.

The wireless communications system shown in FIG. 4 is still used as an example. It is assumed that an A-MPDU in a radio signal sent by a STA numbered 5 is formed by aggregating six MPDUs numbered 1, 2, 3, 4, 5, and 6 respectively. Numbers of MPDUs correctly received by the AP numbered 1 are 1 and 5; a number of an MPDU correctly received by the AP numbered 2 is 4; numbers of MPDUs correctly received by the AP numbered 3 are 1, 3, 4, and 6; and numbers of MPDUs correctly received by the AP numbered 4 are 1 and 3. After each AP sends the correctly received MPDU to the controller 01, the controller 01 may determine that in the A-MPDU sent by the STA numbered 5, the MPDUs numbered 1, 3, 4, 5, and 6 have been correctly received, and the MPDU numbered 2 has not been correctly received. Therefore, the controller 01 may send an indication to the AP numbered 1, to indicate that the MPDUs numbered 1, 3, 4, 5, and 6 have been correctly received, and the MPDU numbered 2 has not been correctly received. The AP numbered is 1 may generate a BA signal based on the indication, and send the BA signal to the STA numbered 5. The STA numbered 5 may resend, based on the BA signal, the MPDU numbered 2.

Because the STA numbered 5 is closest to the AP numbered 3, a propagation path loss between the STA numbered 5 and the AP numbered 3 is relatively small, and an SNR between the STA numbered 5 and the AP numbered 3 is relatively high. Therefore, the AP numbered 3 correctly receives a relatively large quantity of MPDUs, but still fails to correctly receive two MPDUs. However, because the other three APs in the first radio access cell 02 can also receive the radio signal sent by the STA numbered 5, and the AP numbered 1 correctly receives the MPDU that is numbered 5 and that is not correctly received by the AP numbered 3, the uplink receiving performance of the first radio access cell 02 is effectively improved.

It can be learned from the foregoing analysis that in the wireless communications system provided in this embodiment of this application, distributed uplink diversity receiving is implemented through the plurality of radio access nodes, and better uplink receiving performance can be obtained. In addition, this helps further reduce the transmit power of the wireless terminal located outside the main lobe coverage area of the antenna beam of the transceiving access node. In this way, the co-channel interference during the uplink communication is effectively reduced.

Figure 6:
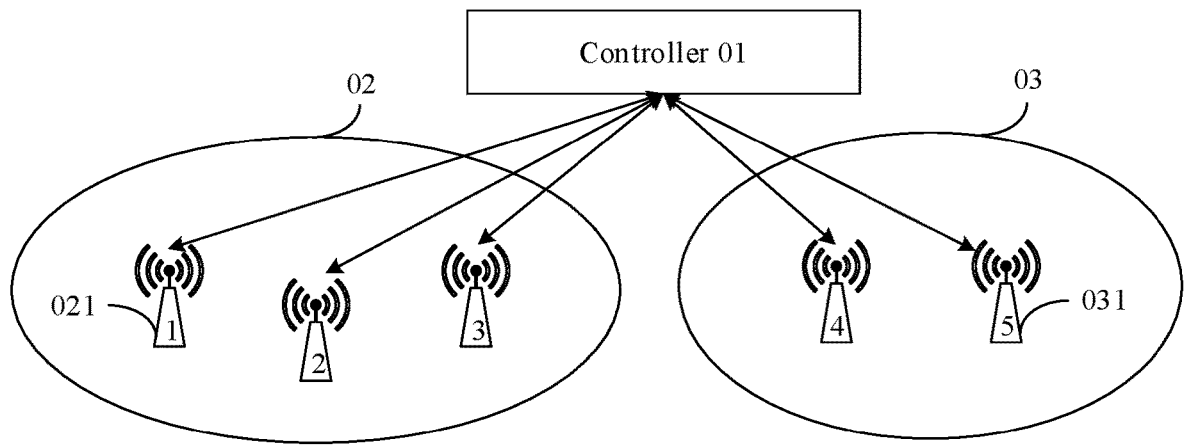
FIG. 6 is an architectural diagram of still another wireless communications system according to an embodiment of this application.

FIG. 6 is an architectural diagram of still another wireless communications system according to an embodiment of this application. It can be learned from FIG. 6 that the system may further include a second radio access cell 03, and the second radio access cell 03 includes a plurality of radio access nodes 031. In FIG. 6, two radio access nodes 031 are used as an example for description. Frequencies of operating channels of the plurality of radio access nodes 031 in the second radio access cell 03 are also the same. In addition, a channel of the second radio access cell 03 and a channel of the first radio access cell 02 may overlap. For example, the channels of the two radio access cells may partially or completely overlap. The channel of the radio access cell is the operating channel of the radio access node in the radio access cell.

In this embodiment of this application, in a scheduling period, in the plurality of radio access nodes 031 in the second radio access cell 03, only a transceiving access node can perform uplink communication and downlink communication with a wireless mobile terminal within a coverage range of the second radio access cell 03. Another radio access node in the second radio access cell 03 serves as an uplink access node, and can receive a radio signal, but cannot send a radio signal.

In the wireless communications system, for each radio access cell in the scheduling period, only the transceiving access node can perform uplink communication and downlink communication, and another uplink access node can only receive the radio signal. Therefore, when a distance between transceiving access nodes of neighboring radio access cells is relatively long, even if channels of the radio access cells overlap, a problem of co-channel interference can be avoided. Therefore, when the radio access cell is deployed, a limitation on a quantity of non-overlapping channels in a 2.4 GHz frequency band and a 5 GHz frequency band may not be needed, so that neighboring radio access cells can be configured for intra-frequency networking. In this way, a channel with a relatively large bandwidth can be selected for each radio access cell based on that a system capacity is ensured. This further improves a data transmission rate of the wireless communications system.

For example, the channel of the second radio access cell 03 and the channel of the first radio access cell 02 may be channels of a same frequency, and the both channels may be channels with a bandwidth of 80 MHz, 160 MHz, or 320 MHz.

Optionally, the controller 01 may be further configured to indicate one radio access node 031 in the second radio access cell 03 to serve as the transceiving access node in the second radio access cell 03 in a second scheduling period. The transceiving access node in the second radio access cell 03 is a radio access node that can perform, in the second scheduling period, uplink communication and downlink communication with the wireless terminal within the coverage range of the second radio access cell 03.

The second scheduling period and the first scheduling period overlap. For example, the two scheduling periods may partially or completely overlap. In addition, a distance between the transceiving access node in the first radio access cell 02 and the transceiving access node in the second radio access cell 03 is greater than a first threshold. The first threshold may be a distance threshold that is preconfigured in the controller 01 and that can ensure that co-channel interference between two radio access nodes that use channels of a same frequency is relatively small, so that correct receiving of the radio signal is not affected. For example, the first threshold may be 25 meters or 30 meters.

When selecting a transceiving access node from a plurality of radio access nodes included in each radio access cell, the controller 01 needs to ensure that transceiving access nodes of two neighboring radio access cells are not adjacent at a same time point, and the transceiving access nodes are staggered as much as possible. In this way, co-channel interference between the two neighboring radio access cells during the downlink communication can be effectively reduced.

Figure 7:
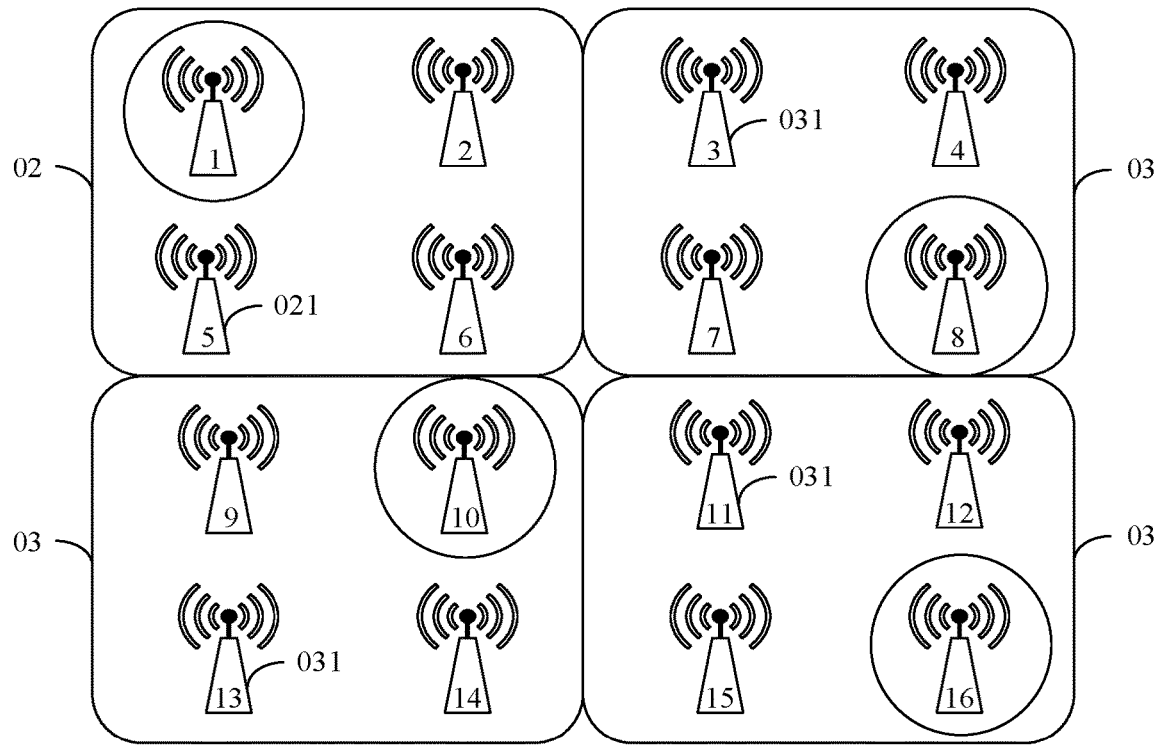
FIG. 7 is an architectural diagram of yet another wireless communications system according to an embodiment of this application.

FIG. 7 is an architectural diagram of yet another wireless communications system according to an embodiment of this application. It is assumed that there are three neighboring second radio access cells 03 around the first radio access cell 02. In addition, in the first scheduling period, the transceiving access node in the first radio access cell 02 is the AP numbered 1. As shown in FIG. 7, in a scheduling period that overlaps the first scheduling period, transceiving access nodes indicated by the controller 01 in the three second radio access cells 03 may be an AP numbered 8, an AP numbered 10, and an AP numbered 16 respectively. It can be learned from FIG. 7 that in a same scheduling period, transceiving access nodes (namely, APs numbered 1, 8, 10, and 16 respectively) indicated by the controller 01 in radio access cells are not adjacent, and a distance between any two APs is greater than the first threshold. In this way, it can be ensured that co-channel interference between the transceiving access nodes is relatively small. Therefore, it can be ensured that neighboring radio access cells can be configured for intra-frequency networking.

It should be noted that, in this embodiment of this application, when selecting a transceiving access node from a plurality of radio access nodes in each radio access cell, the controller 01 may perform selection with reference to two factors: a traffic volume in a main lobe coverage area of an antenna beam of each radio access node and a distance between each radio access node and a transceiving access node in a neighboring radio access cell.

In a radio access cell, distances between a radio access node with a maximum traffic volume and transceiving access nodes in a neighboring radio access cell are not all greater than the first threshold. In this case, the controller 01 may select, from radio access nodes whose distances to the transceiving access nodes in the neighboring radio access cell are all greater than the first threshold, the radio access node with the maximum traffic volume as the transceiving access node. Alternatively, the controller 01 may select, from radio access nodes whose traffic volumes are greater than a traffic volume threshold, a radio access node whose average distance to the transceiving access nodes in the neighboring radio access cell is the largest as the transceiving access node.

For example, the first radio access cell 02 is used as an example. The controller 01 may first determine, from the first radio access cell 02, candidate access nodes based on distances between each radio access node 021 in the first radio access cell 02 and transceiving access nodes in a neighboring radio access cell. Distances between the candidate access nodes and transceiving access nodes in each neighboring radio access cell are all greater than the first threshold. Then, the controller 01 may use, as the transceiving access node in the first scheduling period, a candidate access node that is with a maximum traffic volume and that is in the candidate access nodes.

It should be further noted that, because the controller 01 may select the transceiving access node based on the traffic volume in the main lobe coverage area of the antenna beam of each radio access node, and the traffic volume in the main lobe coverage area of the antenna beam of each radio access node dynamically changes, the controller 01 may determine, based on a change status of the traffic volume in the main lobe coverage area of the antenna beam of each radio access node in each radio access cell, duration of each scheduling period of the radio access cell, and when each scheduling period ends or before each scheduling period ends, select a transceiving access node for a next scheduling period. Because change statuses of traffic volumes in areas of different radio access cells may be different, duration of scheduling periods of different radio access cells may be the same or may be different.

Figure 8:
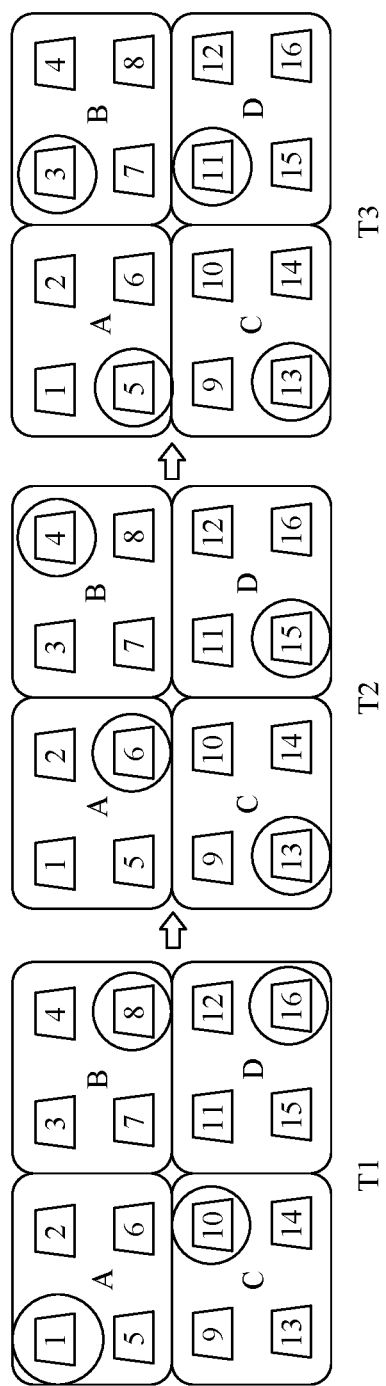
FIG. 8 is a schematic diagram of transceiving access nodes of each radio access cell in different scheduling periods according to an embodiment of this application.

FIG. 8 is a schematic diagram of transceiving access nodes of each radio access cell in different scheduling periods according to an embodiment of this application. As shown in FIG. 8, it is assumed that the WLAN includes four radio access cells numbered A, B, C, and D respectively. In this case, in a T1 scheduling period, transceiving access nodes selected by the controller 01 from the four radio access cells may be APs numbered 1, 8, 10, and 16 respectively. In a T2 scheduling period, transceiving access nodes selected by the controller 01 from the four radio access cells may be APs numbered 6, 4, 13, and 15 respectively. In a T3 scheduling period, transceiving access nodes selected by the controller 01 from the four radio access cells may be APs numbered 5, 3, 13, and 11 respectively. It can be seen from FIG. 8 that, all transceiving access nodes selected by the controller 01 for each radio access cell in each scheduling period are not adjacent, and are all spaced at a given distance. Therefore, co-channel interference between neighboring radio access cells can be effectively reduced.

Optionally, in this embodiment of this application, the controller 01 may be further configured to: if detecting that a traffic volume that is in the detection period and that is of a target radio access cell in the first radio access cell 02 and a traffic volume that is in the detection period and that is of a target radio access cell in the second radio access cell 03 are beyond a traffic volume range, adjust, between a minimum coverage range and a maximum coverage range, a coverage range of the target radio access cell and a coverage range of a neighboring radio access cell of the target radio access cell, to enable a traffic volume that is in the detection period and that is of each radio access cell whose coverage range is adjusted to be within the traffic volume range.

The traffic volume range may be preconfigured in the controller 01. That the coverage range of the radio access cell is adjusted may mean that a quantity of radio access nodes included in the radio access cell is adjusted. The range of the radio access cell is adjusted based on the traffic volume. In this way, an area with a relatively large traffic volume can include a relatively large quantity of radio access cells, to meet a traffic volume requirement of the area. For an area with a relatively small traffic volume, a quantity of radio access cells included in the area may be reduced, to reduce a quantity of transceiving access nodes in the area. In this way, co-channel interference between the radio access cells can be reduced as much as possible based on that a traffic volume requirement of the area is met.

In this embodiment of this application, after adjusting the coverage range of the radio access cell, the controller 01 may reselect a transceiving access node for the radio access cell whose coverage range is adjusted. If a coverage range of a radio access cell after adjustment becomes larger, and a coverage range of an antenna beam of a transceiving access node selected by the controller 01 from the radio access cell cannot completely cover the coverage range of the radio access cell, the controller 01 may further adjust an antenna beam direction of the transceiving access node, so that after the antenna beam direction is adjusted, the coverage range of the antenna beam of the transceiving access node can cover the coverage range of the radio access cell.

It should be noted that a minimum coverage range and a maximum coverage range of each radio access cell may be preconfigured in the controller 01. When adjusting the coverage range of the radio access cell based on the traffic volume, the controller 01 needs to ensure that the adjusted coverage range of the radio access cell is not less than the minimum coverage range, and is not greater than the maximum coverage range. A distance between any two radio access nodes within the minimum coverage range is not greater than the first threshold. The maximum coverage range is not greater than a maximum area that can be covered by the antenna beam of the radio access node. The coverage range of the radio access cell is adjusted between the minimum coverage range and the maximum coverage range. In this way, it can be ensured that the controller can select a proper transceiving access node from the radio access cell whose coverage range is adjusted.

Figure 9:
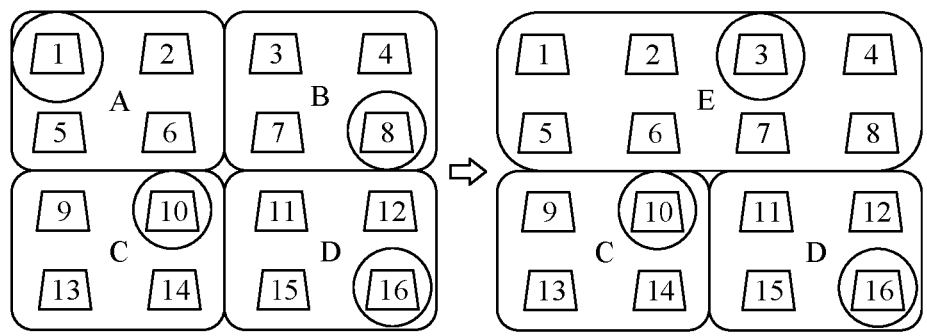
FIG. 9 is a schematic diagram of a change of a coverage range of a radio access cell according to an embodiment of this application.

FIG. 9 is a schematic diagram of a change of a coverage range of a radio access cell according to an embodiment of this application. As shown in FIG. 9, it is assumed that the controller 01 detects that in a detection period, traffic volumes of two radio access cells numbered A and B are both less than a lower limit of the traffic volume range, and traffic volumes of two radio access cells numbered C and D are both within the traffic volume range. Therefore, the controller 01 may combine the two radio access cells numbered A and B into a radio access cell numbered E. In addition, the controller 01 may indicate the AP numbered 3 to serve as a transceiving access node in the radio access cell numbered E. Referring to FIG. 9, it can be learned that after the two radio access cells numbered A and B are combined, a quantity of transceiving access nodes in the WLAN is reduced to 3, so that the co-channel interference between the radio access cells can be effectively reduced.

Optionally, in this embodiment of this application, the controller 01 may be further configured to allocate different time-frequency resources to two wireless terminals located in different radio access cells, where a distance between the two terminals is less than a second threshold.

Alternatively, the transceiving access node in the first radio access cell 02 and the transceiving access node in the second radio access cell 03 may cooperate with each other, to allocate a time-frequency resource to the wireless terminal within the coverage range of the radio access cell to which the transceiving access node belongs. Time-frequency resources allocated to two wireless terminals located in different radio access cells are different, where a distance between the two terminals is less than a second threshold.

In this embodiment of this application, the controller 01 or the transceiving access node allocates different time-frequency resources to the two wireless terminals located in different radio access cells, where the distance between the two terminals is less than the second threshold. In this way, co-channel interference between the two neighboring radio access cells during uplink communication can be effectively reduced.

Optionally, to further reduce the co-channel interference, a frequency difference between the time-frequency resources allocated by the controller 01 or the transceiving access node to the two wireless terminals located in different radio access cells may be greater than a specific threshold, where the distance between the two terminals is less than the second threshold. In other words, the time-frequency resources allocated to the two wireless terminals may be spaced at a given distance in frequency domain.

Figure 10:
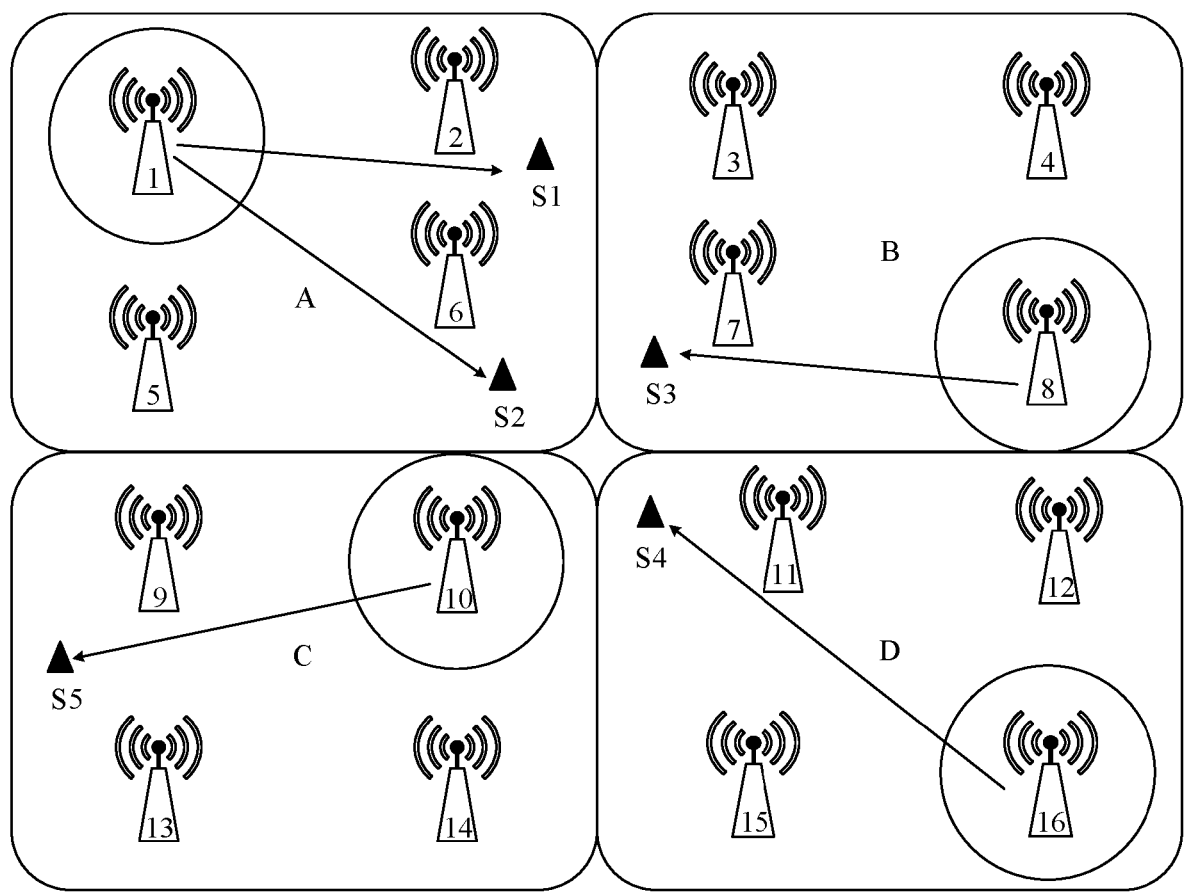
FIG. 10 is an architectural diagram of yet another wireless communications system according to an embodiment of this application.

FIG. 10 is an architectural diagram of yet another wireless communications system according to an embodiment of this application. Referring to 10, it is assumed that in a scheduling period, the transceiving access nodes of the four radio access cells numbered A, B, C, and D are the APs numbered 1, 8, 10, and 16 respectively. Three STAs numbered S2, S3, and S4 are located in coverage ranges of different radio access cells. A distance between every two STAs is less than the second threshold, and each STA is relatively close to a STA (not shown in FIG. 10) located inside a main lobe coverage area of an antenna beam of the AP numbered 10. In this case, the controller 01 may allocate different RUs (for example, RUs that are at least 2 MHz apart in frequency domain) to the three STAs numbered S2, S3, and S4, and the STA located inside the main lobe coverage area of the antenna beam of the AP numbered 10, to reduce co-channel interference between the STAs.

For example, it is assumed that the four radio access cells numbered A, B, C, and D shown in FIG. 10 use channels of a same frequency, and bandwidths of the channels are 80 MHz. Referring to the schematic diagram of the division of the RUs shown in FIG. 5, to reduce the co-channel interference, the controller 01 may use the following RU allocation solution.

For the radio access cell numbered C, the controller 01 may allocate, to the STA located inside the main lobe coverage area of the antenna beam of the AP numbered 10, RUs with a total bandwidth of about 62 MHz: RUs that are of the 242 subcarriers and that are numbered 2 and 3, RUs that are of the 106 subcarriers and that are numbered 2 and 7, an RU that is of the 52 subcarriers and that is numbered 2, and RUs that are of the 26 subcarriers and that are numbered 5 and 33. In addition, an RU (an RU with a bandwidth of about 2 MHz) that is of the 26 subcarriers and that is numbered 19 may be allocated to the STA numbered S5.

For the radio access cell numbered A, the controller may allocate, to the STA located inside the main lobe coverage area of the antenna beam of the AP numbered 1, RUs with a total bandwidth of about 71 MHz: the RU that is of the 484 subcarriers and that is numbered 2, the RU that is of the 242 subcarriers and that is numbered 2, the RU that is of the 106 subcarriers and that is numbered 2, the RU that is of the 52 subcarriers and that is numbered 2, and the RU that is of the 26 subcarriers and that is numbered 5. In addition, the RU that is of the 26 subcarriers and that is numbered 1 may be allocated to the STA numbered S2, and the RU that is of the 26 subcarriers and that is numbered 19 may be allocated to the STA numbered S1.

For the radio access cell numbered B, the controller may allocate, to a STA located inside a main lobe coverage area of an antenna beam of the AP numbered 8, RUs with a total bandwidth of about 71 MHz: an RU that is of the 484 subcarriers and that is numbered 1, the RU that is of the 242 subcarriers and that is numbered 3, the RU that is of the 106 subcarriers and that is numbered 7, an RU that is of the 52 subcarriers and that is numbered 16, and the RU that is of the 26 subcarriers and that is numbered 33. In addition, an RU that is of the 26 subcarriers and that is numbered 35 may be allocated to the STA numbered S3.

For the radio access cell numbered D, the controller may allocate, to the STA located inside the main lobe coverage area of the antenna beam of the AP numbered 8, RUs with a total bandwidth of about 71 MHz: the RU that is of the 484 subcarriers and that is numbered 1, the RU that is of the 242 subcarriers and that is numbered 3, the RU that is of the 106 subcarriers and that is numbered 7, an RU that is of the 52 subcarriers and that is numbered 15, and the RU that is of the 26 subcarriers and that is numbered 33. In addition, the RU that is of the 26 subcarriers and that is numbered 37 may be allocated to the STA numbered S4.

Based on the foregoing RU allocation solution, it can be learned that because the STA located inside the main lobe coverage area of the antenna beam of the transceiving access node (namely, the AP numbered 10) in the radio access cell numbered C is relatively close to the STAs numbered S2, S3, and S4 in the other radio access cells. To avoid the co-channel interference, the total bandwidth of the RUs allocated to the STA located inside the main lobe coverage area of the antenna beam of the AP numbered 10 is about 62 MHz, which is relatively small. Therefore, a large enough bandwidth may be reserved and allocated to the STAs numbered S2, S3, and S4, and the RUs allocated to the STAs numbered S2, S3, and S4 may be spaced apart from each other at a specific distance on a spectrum. For example, the RUs allocated to the STA numbered S2 are relatively far away from the RUs allocated to the STAs numbered S3 and S4 in frequency domain, and the RUs allocated to the STAs numbered S3 and S4 are relatively close in frequency domain, but are also spaced apart from each other by about 2 MHz. Therefore, the co-channel interference between the STAs is relatively small.

However, for a radio access cell with another number, because a distance between transceiving access nodes is relatively long, and a distance between STAs located in a coverage range of another radio access cell is also relatively long, impact of the co-channel interference is relatively small. Therefore, the total bandwidth of the RUs allocated by the controller 01 to the STA located inside the main lobe coverage area of the antenna beam of the transceiving access node in the radio access cell numbered A, B, or D is about 71 MHz, which is relatively large.

Figure 11:
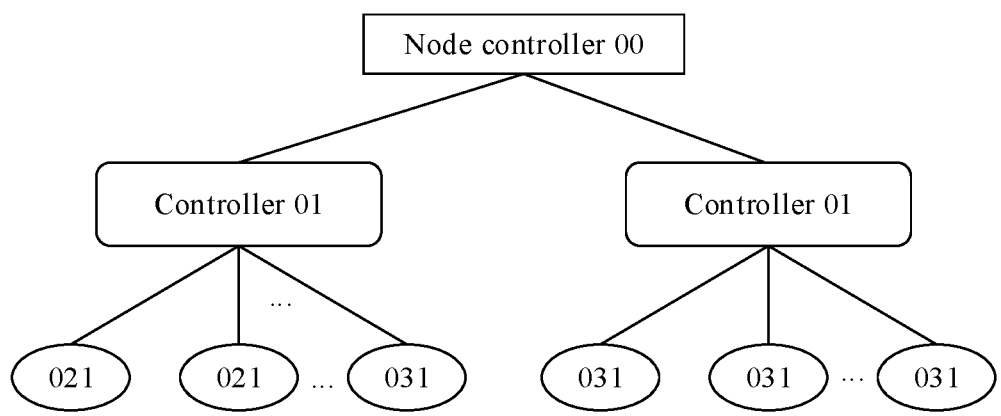
FIG. 11 is an architectural diagram of yet another wireless communications system according to an embodiment of this application.

FIG. 11 is an architectural diagram of yet another wireless communications system according to an embodiment of this application. It can be learned from FIG. 11 that the system may include a plurality of controllers 01, and each controller 01 may be connected to a plurality of radio access nodes. For example, each controller 01 may be connected to radio access nodes in one or more radio access cells.

For example, in the system shown in FIG. 11, one controller 01 may be connected to a radio access node 021 in the first radio access cell 01 and a radio access node 031 in the second radio access cell 03. Another controller 01 may be connected to radio access nodes 031 in two second radio access cells 03.

Optionally, as shown in FIG. 11, the system may further include a node controller 00. Each controller 01 may be connected to the node controller 00. The node controller 00 may be configured to manage all radio access nodes in the system, for example, deliver a configuration, modify a related configuration parameter, and the like.

For example, for the WLAN, the node controller 00 may be an AP controller. The AP controller may be an Access Controller (Access Controller, AC) defined in the Control And Provisioning of Wireless Access Points (Control And Provisioning of Wireless Access Points, CAPWAP) protocol. For the cellular mobile communications system, the node controller 00 may be a network management system (network management system, NMS) of a radio access network (radio access network, RAN).

It can be learned from the foregoing description that in this embodiment of this application, the controller 01 has functions of a control plane and a data plane, and each controller 01 may be responsible for transmission control and data processing of a radio access cell connected to the controller 01. On the data plane, as described above, the controller 01 may perform selective diversity receiving processing on received data.

On the control plane, the controller 01 may be responsible for functions such as scheduling of a transceiving access node, scheduling of a wireless terminal within a coverage range of the radio access cell, and interference management between radio access cells. The scheduling of the transceiving access node may mean that the controller 01 dynamically selects a radio access node in the radio access cell as a transceiving access node in different scheduling periods based on a change status of a traffic volume, interference, and the like in a main lobe coverage area of an antenna beam of each radio access node in the radio access cell. The scheduling of the wireless terminal in the radio access cell may mean that the controller schedules an uplink transmission opportunity and a downlink transmission opportunity of the wireless terminal within the coverage range of the radio access cell, allocates a time-frequency resource to the wireless terminal, and indicates an MCS, transmit power, and the like used by the wireless terminal. The interference management between the radio access cells may mean that a transceiving access node is selected based on a distance between radio access nodes in different radio access cells, and a time-frequency resource is allocated to the wireless terminal based on a distance between wireless terminals located in different radio access cells.

It should be noted that the controller 01 may be disposed independent of the node controller 00, or may be integrated into the node controller 00. This is not limited in this embodiment of this application.

Optionally, in this embodiment of this application, a radio access node of each radio access cell may include a plurality of signal transceiving devices (which may also be referred to as transceivers) on different frequency bands. The plurality of signal transceiving devices on different frequency bands may work independently of each other and do not affect each other. Therefore, it can be ensured that the radio access node can provide a wireless access service for a wireless terminal that supports different frequency bands. This effectively improves compatibility of the wireless communications system.

For example, when the solution provided in this embodiment of this application is applied to the WLAN, to be compatible with a wireless terminal that supports a WLAN standard before IEEE802.11ax, for example, a wireless terminal that supports standards such as 802.11a, 802.11n, and 802.11ac, two signal transceiving devices on different frequency bands may be deployed in each AP. An operating frequency band of one signal transceiving device may be a 5 GHz frequency band, and an operating frequency band of the other signal transceiving device may be a 2.4 GHz frequency band. Alternatively, an operating frequency band of one signal transceiving device may be a high frequency band (for example, 5735 MHz to 5835 MHz) in a 5 GHz frequency band, and an operating frequency band of the other signal transceiving device may be a low frequency band (for example, 5170 MHz to 5330 MHz) in the 5 GHz frequency band, and a 2.4 GHz frequency band. Alternatively, an operating frequency band of one signal transceiving device may be an unlicensed frequency band newly used by the WLAN, for example, a 6 GHz frequency band, and an operating frequency band of the other signal transceiving device may be a 5 GHz frequency band and a 2.4 GHz frequency band.

In conclusion, the embodiment of this application provides the wireless communications system, and frequencies of operating channels of the plurality of radio access nodes in the first radio access cell are the same. In the first scheduling period, in the first radio access cell, only the transceiving access node can perform uplink communication and downlink communication with the wireless terminal, and another uplink access node cannot send a radio signal. Therefore, co-channel interference during the downlink communication can be effectively reduced. In addition, each radio access node in the first radio access cell can receive the radio signal. Therefore, a probability that the radio signal sent by the wireless terminal is correctly received can be increased, and uplink receiving performance of the first radio access cell can be improved. In addition, a wireless terminal within a coverage range of the first radio access cell may send, at relatively low transmit power, the radio signal to a radio access node that is relatively close to the wireless terminal. Therefore, co-channel interference during the uplink communication can be effectively reduced.

In addition, the frequencies of the operating channels of the plurality of radio access nodes in the first radio access cell are the same, and the co-channel interference is relatively small. Therefore, the radio access node in the first radio access cell may use an operating channel with a relatively large bandwidth. In this way, a data transmission rate of the system is effectively improved. In addition, because a problem of the co-channel interference is overcome, a distance between neighboring radio access nodes in the first radio access cell may be relatively small. In other words, density of the radio access nodes deployed in the first radio access cell may be relatively high. Therefore, a system capacity of the wireless communications system can be effectively improved.

Further, in the wireless communications system provided in this embodiment of this application, because the frequencies of the operating channels of the plurality of radio access nodes in the first radio access cell are the same, when roaming between the neighboring radio access nodes, the wireless terminal does not need to switch to an operating channel of a different frequency. Therefore, a switching time during roaming of the wireless terminal is effectively reduced, and seamless roaming of the wireless terminal can be implemented.

Figure 12:
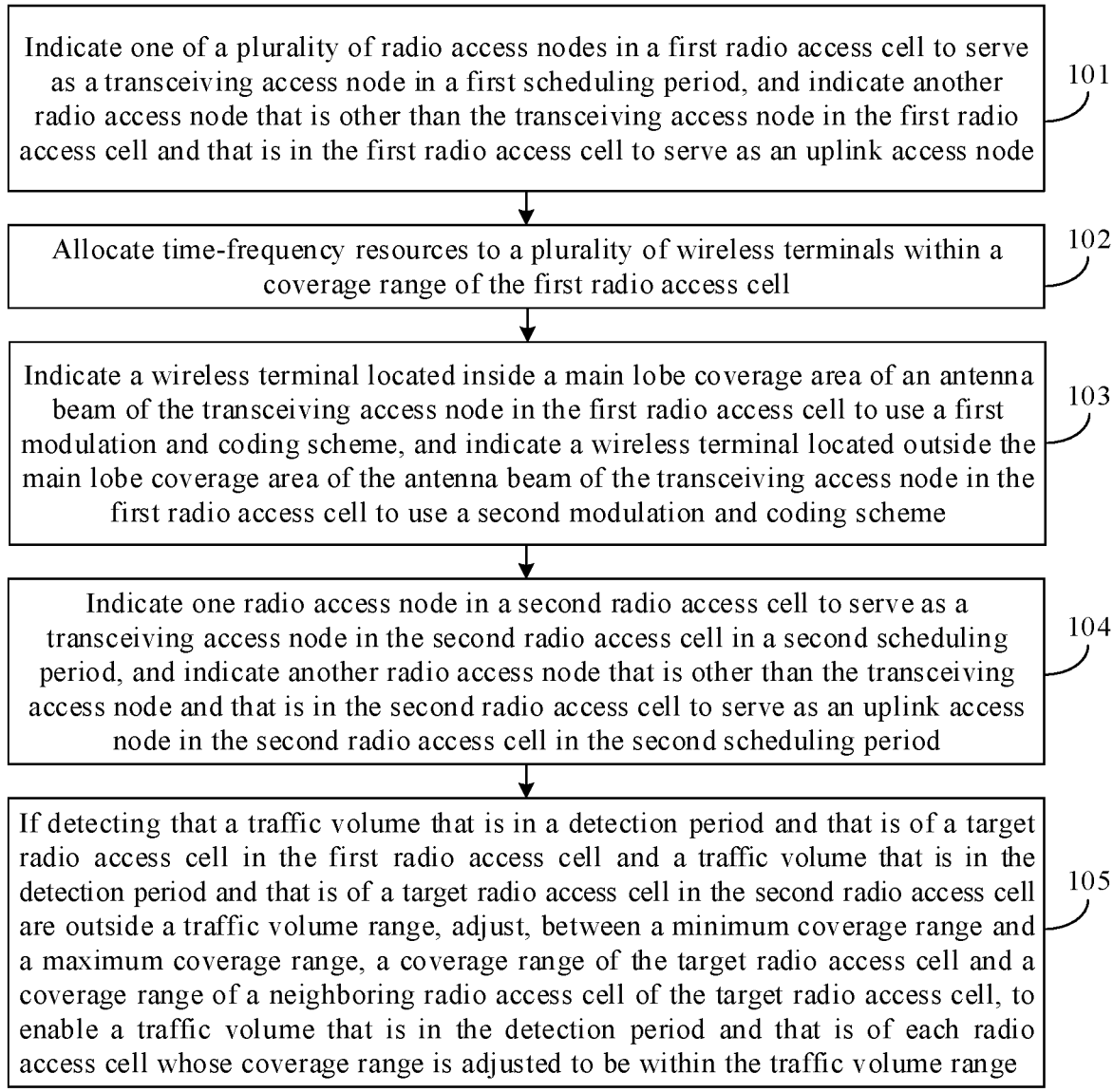
FIG. 12 is a flowchart of a scheduling method according to an embodiment of this application.

An embodiment of this application further provides a scheduling method. The method may be applied to the controller 01 in the wireless communications system provided in the foregoing embodiment. Referring to FIG. 12, the method may include the following step.

Step 101: Indicate one of a plurality of radio access nodes in a first radio access cell to serve as a transceiving access node in a first scheduling period, and indicate a radio access node that is other than the transceiving access node in the first radio access cell and that is in the first radio access cell to serve as an uplink access node.

The transceiving access node in the first radio access cell is a radio access node that can perform, in the first scheduling period, uplink communication and downlink communication with a wireless terminal within a coverage range of the first radio access cell. The uplink access node is a radio access node that can receive a radio signal but cannot send a radio signal in the first scheduling period, and frequencies of operating channels of the plurality of radio access nodes in the first radio access cell are the same.

Optionally, in the foregoing step 101, a process in which the controller indicates one of the plurality of radio access nodes in the first radio access cell to serve as the transceiving access node in the first scheduling period may include:

indicating, based on a traffic volume or a to-be-sent traffic volume that is in a detection period and that is in a main lobe coverage area of an antenna beam of each radio access node in the first radio access cell, one radio access node with a maximum traffic volume in the first radio access cell to serve as the transceiving access node in the first radio access cell in the first scheduling period.

Optionally, referring to FIG. 4, it can be learned that there are the plurality of wireless terminals within the coverage range of the first radio access cell 02, for example, the STAs numbered S1 to S5 shown in FIG. 4. Referring to FIG. 12, the method may further include the following step.

Step 102: Allocate time-frequency resources to the plurality of wireless terminals within the coverage range of the first radio access cell.

A total resource volume of a time-frequency resource obtained by a wireless terminal that is in the plurality of wireless terminals and that is located inside a main lobe coverage area of an antenna beam of the transceiving access node in the first radio access cell is greater than a total resource volume obtained by a wireless terminal that is in the plurality of wireless terminals and is located outside the main lobe coverage area of the antenna beam of the transceiving access node in the first radio access cell.

Referring to FIG. 12, the method may further include the following step.

Step 103: Indicate the wireless terminal located inside the main lobe coverage area of the antenna beam of the transceiving access node in the first radio access cell to use a first modulation and coding scheme, and indicate the wireless terminal located outside the main lobe coverage area of the antenna beam of the transceiving access node in the first radio access cell to use a second modulation and coding scheme.

An order of the first modulation and coding scheme is greater than an order of the second modulation and coding scheme.

In the embodiment of this application, as shown in FIG. 6, the wireless communications system may further include the second radio access cell 03. As shown in FIG. 12, the scheduling method may further include the following step.

Step 104: Indicate one radio access node in the second radio access cell to serve as a transceiving access node in the second radio access cell in a second scheduling period, and indicate another radio access node that is other than the transceiving access node and that is in the second radio access cell to serve as an uplink access node in the second radio access cell in the second scheduling period.

The transceiving access node in the second radio access cell is a radio access node that can perform, in the second scheduling period, uplink communication and downlink communication with a wireless terminal within a coverage range of the second radio access cell. The uplink access node in the second radio access cell is a radio access node that can receive a radio signal but cannot send a radio signal in the second scheduling period.

The second scheduling period and the first scheduling period overlap, and a distance between the transceiving access node in the first radio access cell and the transceiving access node in the second radio access cell is greater than a first threshold.

Optionally, in the foregoing step 102, when allocating the time-frequency resources to the wireless terminals, the controller 01 may allocate different time-frequency resources to two wireless terminals located in different radio access cells, where a distance between the two wireless terminals is less than a second threshold.

Referring to FIG. 12, the method may further include the following step.

Step 105: If detecting that a traffic volume that is in the detection period and that is of a target radio access cell in the first radio access cell and a traffic volume that is in the detection period and that is of a target radio access cell in the second radio access cell are beyond a traffic volume range, adjust, between a minimum coverage range and a maximum coverage range, a coverage range of the target radio access cell and a coverage range of a neighboring radio access cell of the target radio access cell, to enable a traffic volume that is in the detection period and that is of each radio access cell whose coverage range is adjusted to be within the traffic volume range.

For an implementation process of each step in the foregoing step 101 to step 105, refer to related descriptions in the foregoing system embodiment, and details are not described herein again.

It should be noted that a sequence of the steps of the scheduling method provided in this embodiment of this application may be properly adjusted, and a step may be added or removed based on a situation. For example, step 102 to step 105 may be deleted based on a situation. Alternatively, step 103 and step 102 may be performed at the same time, or may be performed before step 102. Alternatively, step 104 may be performed before step 103, and step 105 may also be performed independent of step 104. Any variation readily figured out by a person skilled in the art within the technical scope disclosed in this application shall fall within the protection scope of this application, and details are not described herein again.

In conclusion, this embodiment of this application provides the scheduling method. In the first scheduling period, in the first radio access cell, only the transceiving access node indicated by the controller can perform uplink communication and downlink communication with the wireless terminal, and another uplink access node indicated by the controller cannot send a radio signal. Therefore, co-channel interference during the downlink communication can be effectively reduced. In addition, each radio access node in the first radio access cell can receive the radio signal. Therefore, a probability that the radio signal sent by the wireless terminal is correctly received can be increased, and uplink receiving performance of the first radio access cell can be improved. In addition, the wireless terminal located within the coverage range of the first radio access cell may send, at relatively low transmit power, the radio signal to a radio access node that is relatively close to the wireless terminal. Therefore, co-channel interference during the uplink communication can be effectively reduced.

Figure 13:
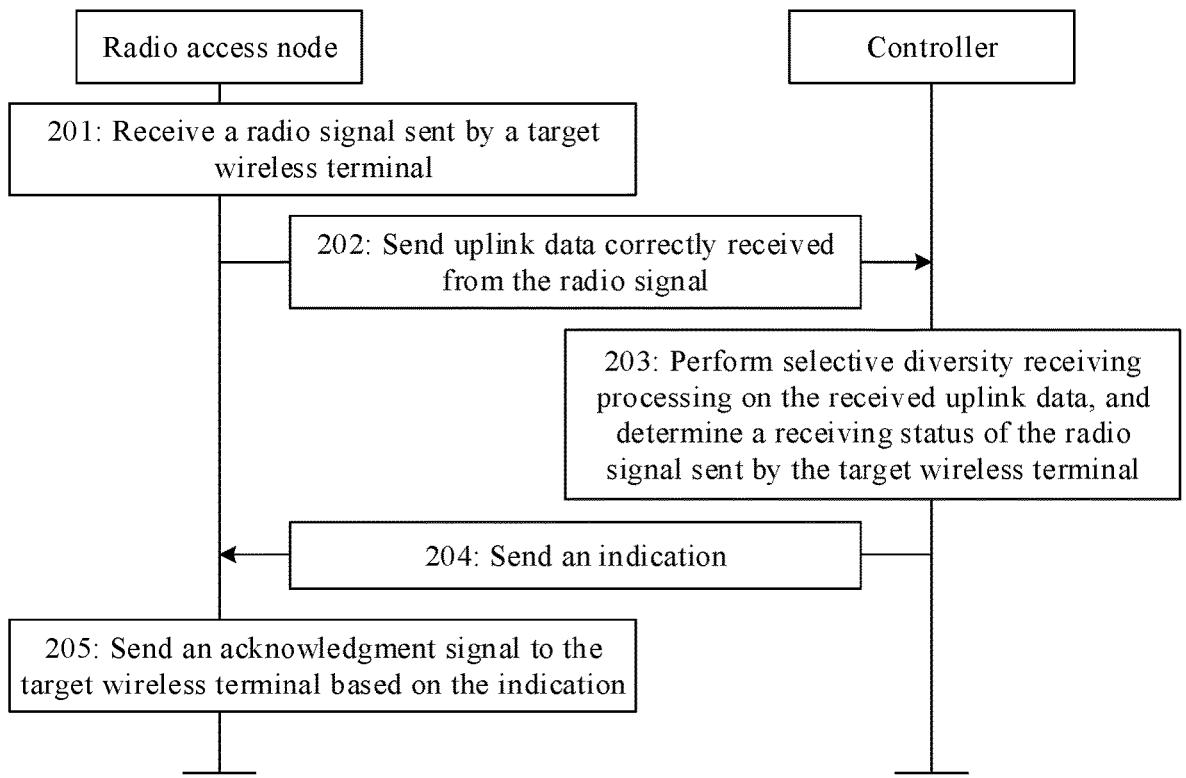
FIG. 13 is a flowchart of a wireless communications method according to an embodiment of this application.

An embodiment of this application further provides a wireless communications method. The method may be applied to the wireless communications system provided in the foregoing embodiment. The following uses an example in which the wireless communications method is applied to the first radio access cell for description. Referring to FIG. 13, the method may include the following steps.

Step 201: A radio access node receives a radio signal sent by a target wireless terminal.

For example, referring to FIG. 4, it is assumed that the target wireless terminal within the coverage range of the first radio access cell 02 is the STA numbered S5. After the STA numbered S5 sends a radio signal, at least one AP in the APs numbered 1 to 4 in the first radio access cell 02 may receive the radio signal.

Step 202: The radio access node sends uplink data correctly received from the radio signal to a controller.

Each radio access node that receives the radio signal may send the uplink data correctly received from the radio signal to the controller. Therefore, the controller may receive uplink data sent by at least one radio access node in the first radio access cell.

For example, it is assumed that the A-MPDU in the radio signal sent by the STA numbered S5 is formed by aggregating the six MPDUs numbered 1, 2, 3, 4, 5, and 6 respectively. The numbers of the MPDUs correctly received by the AP numbered 1 are 1 and 5; the number of the MPDU correctly received by the AP numbered 2 is 4; the numbers of the MPDUs correctly received by the AP numbered 3 are 1, 3, 4, and 6; and the numbers of the MPDUs correctly received by the AP numbered 4 are 1 and 3. In this case, each AP may send the correctly received MPDU to the controller 01.

Step 203: The controller performs selective diversity receiving processing on the received uplink data, and determines a receiving status of the radio signal sent by the target wireless terminal.

For example, the controller 01 may determine, based on the MPDU sent by each AP, that in the radio signal sent by the STA numbered 5, the MPDUs numbered 1, 3, 4, 5, and 6 have been correctly received, and the MPDU numbered 2 has not been correctly received.

Step 204: The controller sends an indication to the transceiving access node of the first radio access cell.

The indication may be used to indicate the receiving status of the radio signal sent by the target wireless terminal, that is, whether the uplink data included in the radio signal is correctly received by the radio access node.

For example, the controller 01 may send, to the AP numbered 1, an indication used to indicate that the MPDUs numbered 1, 3, 4, 5, and 6 have been correctly received and the MPDU numbered 2 has not been correctly received.

Step 205: The radio access node used as the transceiving access node sends an acknowledgment signal to the target wireless terminal based on the indication.

The indication that is sent by the controller and that is received by the radio access node used as the transceiving access node may include the status that is sent by the target wireless terminal and that is received by at least one radio access node in a plurality of radio access nodes in the radio access cell in which the radio access node is located. Therefore, the transceiving access node may send the acknowledgment signal to the target wireless terminal based on the indication. The target terminal may further determine, based on the acknowledgment signal, whether to resend the radio signal.

For example, after receiving the indication, the AP numbered 1 may send the BA signal to the STA numbered S5, and the STA numbered S5 may further resend, based on the BA signal, the MPDU numbered 2.

Optionally, in this embodiment of this application, the radio access node used as the transceiving access node may further perform the method shown in step 102 and step 103 in the foregoing scheduling method embodiment. That is, the radio access node used as the transceiving access node may allocate a time-frequency resource to the wireless terminal located within the coverage range of the radio access cell, and indicate an MCS that needs to be used by the wireless terminal.

For an implementation process of each step in the foregoing step 201 to step 205, refer to related descriptions in the foregoing wireless communications system embodiment, and details are not described herein again.

In conclusion, the embodiment of this application provides the wireless communications method. Each radio access node in the first radio access cell can receive the radio signal, and send the uplink data correctly received from the radio signal to the controller, so that the controller sends the indication to the transceiving access node based on the received uplink data, and the transceiving access node is enabled to send the acknowledgment signal to the target wireless terminal based on the indication. Because the communications method implements distributed uplink diversity receiving, better uplink receiving performance can be obtained. In addition, this helps further reduce transmit power of a wireless terminal located outside a main lobe coverage area of an antenna beam of the transceiving access node. In this way, co-channel interference during uplink communication is effectively reduced.

Figure 14:
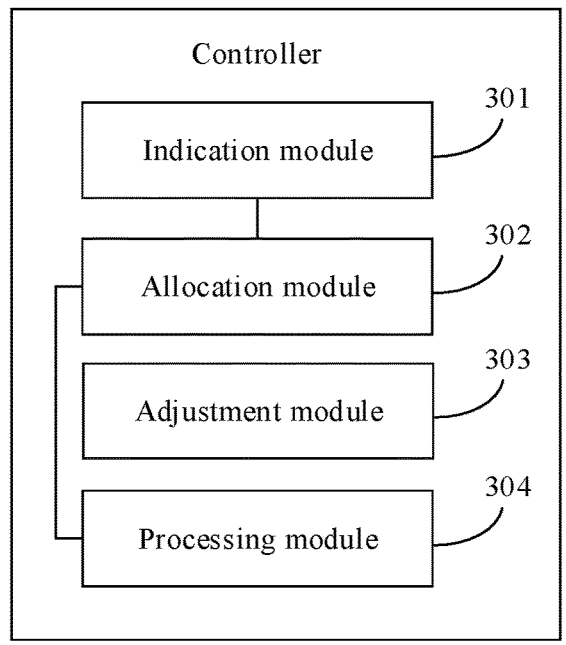
FIG. 14 is a schematic structural diagram of a controller according to an embodiment of this application.

FIG. 14 is a schematic structural diagram of a controller according to an embodiment of this application. The controller may be applied to the wireless communications system provided in the foregoing embodiment. As shown in FIG. 14, the controller may include:

an indication module 301, configured to implement the method shown in step 101 in the embodiment shown in FIG. 12.

Optionally, referring to FIG. 14, the controller may further include:

an allocation module 302, configured to implement the method shown in step 102 in the embodiment shown in FIG. 12.

Optionally, the indication module 301 may be further configured to implement the method shown in at least one of step 103 and step 104 in the embodiment shown in FIG. 12.

As shown in FIG. 14, the controller may further include:

an adjustment module 303, configured to implement the method shown in step 105 in the embodiment shown in FIG. 12, and a processing module 304, configured to implement the method shown in step 203 in the embodiment shown in FIG. 13.

Optionally, the indication module 301 may be further configured to implement the method shown in step 204 in the embodiment shown in FIG. 13.

For the controller provided in the foregoing embodiment, division of the foregoing functional modules is merely used as an example for description. During actual application, the foregoing functions may be allocated to different functional modules for implementation based on a requirement. That is, an internal structure of the device is divided into different functional modules to implement all or some of the functions described above. In addition, the controller provided in the foregoing embodiment and the foregoing method embodiment pertain to a same idea. For an implementation process thereof, refer to the method embodiment. Details are not described herein again.

Figure 15:
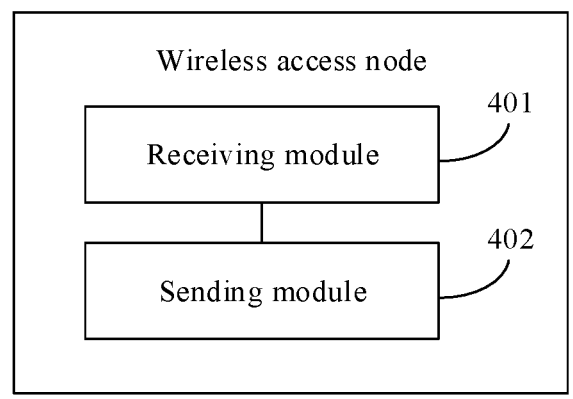
FIG. 15 is a schematic structural diagram of a radio access node according to an embodiment of this application.

FIG. 15 is a schematic structural diagram of a radio access node according to an embodiment of this application. The radio access node may be applied to the wireless communications system provided in the foregoing embodiment. As shown in FIG. 15, the radio access node may include:

a receiving module 401, configured to receive an indication sent by a controller, where for an implementation process in which the receiving module 401 receives the indication sent by the controller, refer to related descriptions in step 204 in the embodiment shown in FIG. 13; and a sending module 402, configured to implement the method shown in step 205 in the embodiment shown in FIG. 13.

Optionally, the sending module 402 may be further configured to implement the method shown in at least one of step 102 and step 103 in the embodiment shown in FIG. 12.

For the radio access node provided in the foregoing embodiment, division of the foregoing functional modules is merely used as an example for description. During actual application, the foregoing functions may be allocated to different functional modules for implementation based on a requirement. That is, an internal structure of the device is divided into different functional modules to implement all or some of the functions described above. In addition, the radio access node provided in the foregoing embodiment and the foregoing method embodiment pertain to a same idea. For an implementation process thereof, refer to the method embodiment. Details are not described herein again.

Figure 16:
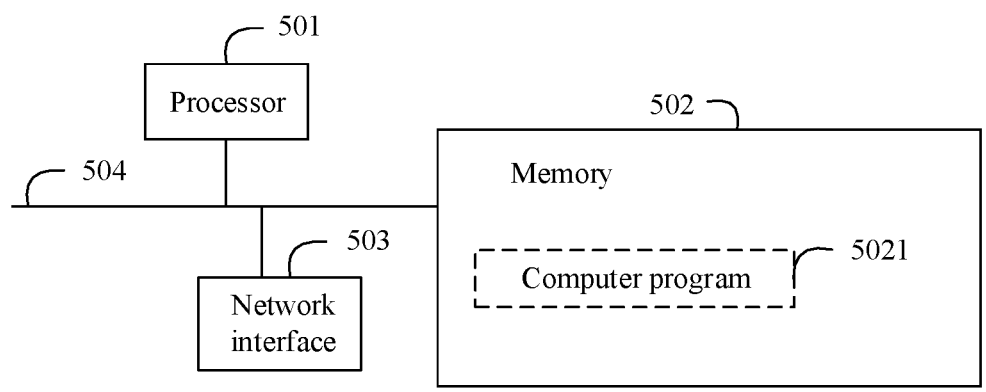
FIG. 16 is a schematic structural diagram of a wireless communications device according to an embodiment of this application.

FIG. 16 is a schematic structural diagram of a wireless communications device according to an embodiment of this application. The wireless communications device may be the controller or the radio access node provided in the foregoing embodiment. Referring to FIG. 16, the wireless communications device may include a processor 501, a memory 502, a network interface 503, and a bus 504. The bus 504 is configured to connect the processor 501, the memory 502, and the network interface 503. A communication connection to another device may be implemented through the network interface 503 (which may be wired or wireless). The memory 502 stores computer programs 5021, and the computer programs 5021 are used to implement various application functions.

It should be understood that, in this embodiment of this application, the processor 501 may be a CPU, or the processor 501 may be another general purpose processor, a digital signal processor (DSP), an application-specific integrated circuit (ASIC), a field programmable gate array (FPGA), a generic array logic (GAL) or another programmable logic device, a discrete gate or a transistor logic device, a discrete hardware component, or any combination of the foregoing processors. The general purpose processor may be a microprocessor, any conventional processor, or the like.

The memory 502 includes a volatile memory, a non-volatile memory, or a combination thereof The non-volatile memory may be a read-only memory (read-only memory, ROM), a programmable read-only memory (PROM), an erasable programmable read-only memory (EPROM), an electrically erasable programmable read-only memory (EE-PROM), a flash memory, or any combination thereof. The volatile memory may be a random access memory (RAM), for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (enhanced SDRAM, ESDRAM), a synchlink dynamic random access memory (synchlink DRAM, SLDRAM), a direct rambus random access memory (direct rambus RAM, DR RAM), or any combination thereof The bus 504 may further include a power bus, a control bus, a status signal bus, and the like, in addition to a data bus. However, for clear description, various types of buses in the figure are marked as the bus 504.

The processor 501 may be configured to execute the computer programs stored in the memory 502. When the wireless communications device is the controller, the processor 501 executes the computer programs 5021 to implement the steps performed by the controller in the foregoing method embodiment. When the wireless communications device is the radio access node, the processor 501 executes the computer programs 5021 to implement the steps performed by the radio access node in the foregoing method embodiment.

It should be understood that the scheduling method or the wireless communications method provided in the foregoing method embodiment may also be implemented by using software. When the method provided in the foregoing method embodiment is implemented by using the software, the modules in the controller and the radio access node may also be software modules.

An embodiment of this application further provides a computer-readable storage medium. The computer-readable storage medium stores instructions. When the computer-readable storage medium is run on a computer, the computer is enabled to perform the steps performed by the controller or the steps performed by the radio access node in the foregoing method embodiment.

An embodiment of this application further provides a computer program product including instructions. When the computer program product is run on a computer, the computer is enabled to perform the steps performed by the controller or the steps performed by the radio access node in the foregoing method embodiment.

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, mobile terminal, computer, server, or data center to another website, mobile terminal, computer, server, or data center in a wired (for example: a coaxial cable, an optical fiber, a twisted pair) or wireless (for example: infrared, microwave, or the like) manner. The computer-readable storage medium may be any medium accessible by a computer, or a data storage device, such as a server or a data center, integrating one or more usable media. The medium may be a magnetic medium (for example, a floppy disk, a hard disk, or a magnetic tape), an optical medium (for example, an optical disc), or a semiconductor medium. The semiconductor medium may be a solid-state drive (solid state drive, SSD).

The foregoing descriptions are merely optional embodiments of this application, but are not intended to limit this application. The protection scope of this application is subject to the claims.

What is claimed is:

1. A wireless communications system, comprising:
   a controller; and
   a first radio access cell, wherein the first radio access cell comprises a plurality of radio access nodes, and frequencies of operating channels of the plurality of radio access nodes in the first radio access cell are the same;
   wherein the controller is configured to indicate one radio access node in the first radio access cell to serve as a transceiving access node in the first radio access cell in a first scheduling period, wherein the transceiving access node in the first radio access cell is a radio access node that is capable of performing, in the first scheduling period, uplink communication and downlink communication with a wireless terminal within a coverage range of the first radio access cell; and
   wherein another radio access node that is other than the transceiving access node in the first radio access cell and that is in the first radio access cell is an uplink access node, wherein the uplink access node is a radio access node that is capable of receiving a radio signal but is not capable of sending a radio signal in the first scheduling period;
   wherein at least one radio access node in the first radio access cell is further configured to:
     receive a radio signal sent by a target wireless terminal within the coverage range of the first radio access cell, and send uplink data correctly received from the radio signal to the controller;
   wherein the controller is further configured to send an indication to the transceiving access node in the first radio access cell based on the received uplink data, wherein the indication is used to indicate a receiving status of the radio signal sent by the target wireless terminal; and
   wherein the transceiving access node in the first radio access cell is further configured to send an acknowledgment signal to the target wireless terminal based on the indication.

2. The wireless communication system according to claim 1, wherein one of basic service set identifiers of the plurality of radio access nodes in the first radio access cell are the same, or cellular identifiers of the plurality of radio access nodes in the first radio access cell are the same.

3. The wireless communication system according to claim 1, wherein the controller is further configured to:
   indicate, based on a traffic volume or a to-be-sent traffic volume that is in a detection period and that is in a main lobe coverage area of an antenna beam of each radio access node in the first radio access cell, one radio access node with a maximum traffic volume in the first radio access cell to serve as the transceiving access node in the first radio access cell in the first scheduling period.

4. The wireless communication system according to claim 1, wherein there are a plurality of wireless terminals within the coverage range of the first radio access cell, and one of the controller or the transceiving access node in the first radio access cell is further configured to:
   allocate time-frequency resources to the plurality of wireless terminals, wherein a total resource volume of the time-frequency resource obtained by a wireless terminal that is in the plurality of wireless terminals and that is located inside a main lobe coverage area of an antenna beam of the transceiving access node in the first radio access cell is greater than a total resource volume obtained by a wireless terminal that is in the plurality of wireless terminals and is located outside the main lobe coverage area of the antenna beam of the transceiving access node in the first radio access cell.

5. The wireless communication system according to claim 1, wherein one of the controller or the transceiving access node in the first radio access cell is further configured to:
   indicate the wireless terminal located inside the main lobe coverage area of the antenna beam of the transceiving access node in the first radio access cell to use a first modulation and coding scheme, and indicate the wireless terminal located outside the main lobe coverage area of the antenna beam of the transceiving access node in the first radio access cell to use a second modulation and coding scheme, wherein
   an order of the first modulation and coding scheme is greater than an order of the second modulation and coding scheme.

6. The wireless communication system according to claim 1, wherein the system further comprises a second radio access cell, the second radio access cell comprises a plurality of radio access nodes, frequencies of operating channels of the plurality of radio access nodes in the second radio access cell are the same, and a channel of the second radio access cell and a channel of the first radio access cell overlap.

7. The wireless communication system according to claim 6, wherein the controller is further configured to:
   indicate one radio access node in the second radio access cell to serve as a transceiving access node in the second radio access cell in a second scheduling period, wherein the transceiving access node in the second radio access cell is a radio access node that is capable of performing, in the second scheduling period, uplink communication and downlink communication with a wireless terminal within a coverage range of the second radio access cell, wherein
   the second scheduling period and the first scheduling period overlap, and a distance between the transceiving access node in the first radio access cell and the transceiving access node in the second radio access cell is greater than a first threshold.

8. The wireless communication system according to claim 6, wherein the controller is further configured to:
   when detecting that a traffic volume that is in the detection period and that is of a target radio access cell in the first radio access cell and a traffic volume that is in the detection period and that is of a target radio access cell in the second radio access cell are beyond a traffic volume range, adjust, between a minimum adjustment range and a maximum adjustment range, a coverage range of the target radio access cell and a coverage range of a neighboring radio access cell of the target radio access cell, to enable a traffic volume that is in the detection period and that is of each radio access cell whose coverage range is adjusted to be within the traffic volume range.

9. The wireless communication system according to claim 7, wherein the controller is further configured to:
allocate different time-frequency resources to two wireless terminals located in different radio access cells, wherein a distance between the two terminals is less than a second threshold.

10. The wireless communication system according to claim 6, wherein the transceiving access node in the first radio access cell and the transceiving access node in the second radio access cell are further configured to cooperate with each other, to allocate a time-frequency resource to the wireless terminal within the coverage range of the radio access cell to which the transceiving access node belongs, wherein
time-frequency resources obtained by two wireless terminals located in different radio access cells are different, wherein a distance between the two terminals is less than a second threshold.

11. A scheduling method, wherein the method comprises:
indicating, by a controller, one of a plurality of radio access nodes in a first radio access cell to serve as a transceiving access node in a first scheduling period; and
indicating another radio access node that is other than the transceiving access node in the first radio access cell and that is in the first radio access cell to serve as an uplink access node,
receiving, by the controller, uplink data sent by at least one radio access node in the first radio access cell, wherein the uplink data is data correctly received by the at least one radio access node from a radio signal sent by a target wireless terminal; and
sending, by the controller based on the received uplink data, an indication to the transceiving access node in the first radio access cell, wherein the indication is used to indicate a receiving status of the radio signal sent by the target wireless terminal, and indicate the transceiving access node to send an acknowledgment signal to the target wireless terminal,
wherein:
the transceiving access node in the first radio access cell is a radio access node that is capable of performing, in the first scheduling period, uplink communication and downlink communication with a wireless terminal within a coverage range of the first radio access cell;
the uplink access node is a radio access node that is capable of receiving a radio signal but is not capable of sending a radio signal in the first scheduling period; and frequencies of operating channels of the plurality of radio access nodes in the first radio access cell are the same.

12. The scheduling method according to claim 11, wherein the indicating, by a controller, one of a plurality of radio access nodes in a first radio access cell to serve as a transceiving access node in a first scheduling period comprises:
indicating, by the controller based on one of a traffic volume or a to-be-sent traffic volume that is in a detection period and that is in a main lobe coverage area of an antenna beam of each radio access node in the first radio access cell, one radio access node with a maximum traffic volume in the first radio access cell to serve as the transceiving access node in the first radio access cell in the first scheduling period.

13. The scheduling method according to claim 11, wherein there are a plurality of wireless terminals within the coverage range of the first radio access cell, and the method further comprises:
allocating, by the controller, time-frequency resources to the plurality of wireless terminals, wherein
a total resource volume of the time-frequency resource obtained by a wireless terminal that is in the plurality of wireless terminals and that is located inside a main lobe coverage area of an antenna beam of the transceiving access node in the first radio access cell is greater than a total resource volume obtained by a wireless terminal that is in the plurality of wireless terminals and is located outside the main lobe coverage area of the antenna beam of the transceiving access node in the first radio access cell.

14. The scheduling method according to claim 11, wherein the method further comprises:
indicating, by the controller, the wireless terminal located inside the main lobe coverage area of the antenna beam of the transceiving access node in the first radio access cell to use a first modulation and coding scheme; and
indicating, by the controller, the wireless terminal located outside the main lobe coverage area of the antenna beam of the transceiving access node in the first radio access cell to use a second modulation and coding scheme, wherein
an order of the first modulation and coding scheme is greater than an order of the second modulation and coding scheme.

15. The scheduling method according to claim 11, wherein the method further comprises:
indicating, by the controller, one radio access node in a second radio access cell to serve as a transceiving access node in the second radio access cell in a second scheduling period, wherein the transceiving access node in the second radio access cell is a radio access node that is capable of performing, in the second scheduling period, uplink communication and downlink communication with a wireless terminal within a coverage range of the second radio access cell, wherein
the second scheduling period and the first scheduling period overlap, and a distance between the transceiving access node in the first radio access cell and the transceiving access node in the second radio access cell is greater than a first threshold.

16. The scheduling method according to claim 11, wherein the method further comprises:
when detecting, by the controller, that a traffic volume that is in the detection period and that is of a target radio access cell in the first radio access cell and a traffic volume that is in the detection period and that is of a target radio access cell in the second radio access cell are beyond a traffic volume range, adjusting, between a minimum adjustment range and a maximum adjustment range, a coverage range of the target radio access cell and a coverage range of a neighboring radio access cell of the target radio access cell, to enable a traffic volume that is in the detection period and that is of each radio access cell whose coverage range is adjusted to be within the traffic volume range.

17. The scheduling method according to claim 11, wherein the method further comprises:
allocating, by the controller, different time-frequency resources to two wireless terminals of the plurality of wireless terminals located in different radio access cells, wherein a distance between the two terminals is less than a second threshold.

18. A wireless communications method, comprising:
- receiving, by a radio access node, a first indication sent by a controller, wherein the first indication indicate the radio access node in a first radio access cell to serve as a transceiving access node in the first radio access cell in a first scheduling period, wherein the transceiving access node in the first radio access cell is a radio access node that is capable of performing, in the first scheduling period, uplink communication and downlink communication with a wireless terminal within a coverage range of the first radio access cell, wherein another radio access node that is other than the transceiving access node in the first radio access cell and that is in the first radio access cell is an uplink access node, wherein the uplink access node is a radio access node that is capable of receiving a radio signal but is not capable of sending a radio signal in the first scheduling period;
- performing, by the radio access node, in the first scheduling period, uplink communication and downlink communication with the wireless terminal within the coverage range of the first radio access cell, wherein a radio signal sent by the wireless terminal within the coverage range of the first radio access cell is received by at least one radio access node in the first radio access cell, and wherein uplink data correctly received from the radio signal is sent by the at least one radio access node in the first radio access cell to the controller;
- receiving, by the radio access node, a second indication from the controller based on the uplink data received by the controller, wherein the second indication is used to indicate a receiving status of the radio signal sent by the wireless terminal; and
- sending, by the radio access node, an acknowledgement signal to the wireless terminal based on the second indication.

* * * * *

UNITED STATES PATENT AND TRADEMARK OFFICE
CERTIFICATE OF CORRECTION

PATENT NO. : 12,177,876 B2  
APPLICATION NO. : 17/541664  
DATED : December 24, 2024  
INVENTOR(S) : Sheng Liu Page 1 of 1

It is certified that error appears in the above-identified patent and that said Letters Patent is hereby corrected as shown below:

In the Claims

Claim 1: Column 33, Line 27: "coverage range of the first radio access cell; and" should read as -- coverage range of the first radio access cell; --.

Claim 11: Column 35, Line 48: "radio access cell;" should read as -- radio access cell; and --.

Signed and Sealed this  
Tenth Day of June, 2025

Coke Morgan Stewart  
*Acting Director of the United States Patent and Trademark Office*